(12) United States Patent
Zheng et al.

(10) Patent No.: US 8,781,336 B1
(45) Date of Patent: Jul. 15, 2014

(54) OPTICAL FILTER FOR USE IN A LASER TRANSMITTER

(75) Inventors: Xueyan Zheng, Andover, MA (US); Kevin J. McCallion, Winchester, MA (US); Daniel Mahgerefteh, Los Angeles, CA (US); Vincent Lixiang Bu, Wilmington, MA (US); Yasuhiro Matsui, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 211 days.

(21) Appl. No.: 13/370,796

(22) Filed: Feb. 10, 2012

Related U.S. Application Data

(60) Provisional application No. 61/441,362, filed on Feb. 10, 2011.

(51) Int. Cl.
   *H04B 10/04* (2006.01)

(52) U.S. Cl.
   USPC ............................. 398/186; 398/187; 398/182

(58) Field of Classification Search
   USPC .................. 398/193, 199, 182–183, 186–187
   See application file for complete search history.

(56) References Cited

U.S. PATENT DOCUMENTS

| | | | | |
|---|---|---|---|---|
| 4,561,119 A | * | 12/1985 | Epworth | 398/195 |
| 4,805,235 A | * | 2/1989 | Henmi | 398/195 |
| 5,073,331 A | * | 12/1991 | Shirasaki | 372/26 |
| 5,379,144 A | * | 1/1995 | Shirasaki | 398/192 |
| 5,416,629 A | * | 5/1995 | Huber | 398/187 |
| 5,742,714 A | * | 4/1998 | Byron | 385/27 |
| 5,923,458 A | * | 7/1999 | Fuse et al. | 359/278 |
| 6,104,851 A | * | 8/2000 | Mahgerefteh | 385/37 |
| 6,473,214 B1 | * | 10/2002 | Roberts et al. | 398/183 |
| 6,519,270 B1 | * | 2/2003 | Kim et al. | 372/28 |
| 6,760,142 B2 | * | 7/2004 | Leuthold et al. | 359/279 |
| 6,788,424 B1 | * | 9/2004 | Bussard et al. | 356/519 |
| 7,076,170 B2 | * | 7/2006 | Choa | 398/115 |
| 7,116,917 B2 | * | 10/2006 | Miyamoto et al. | 398/185 |
| 7,356,264 B2 | * | 4/2008 | Mahgerefteh et al. | 398/193 |
| 7,406,266 B2 | * | 7/2008 | Mahgerefteh et al. | 398/186 |
| 7,502,532 B2 | * | 3/2009 | McCallion et al. | 385/27 |
| 7,657,179 B2 | * | 2/2010 | Mahgerefteh et al. | 398/82 |
| 7,813,648 B2 | * | 10/2010 | Mahgerefteh et al. | 398/158 |
| 8,306,433 B2 | * | 11/2012 | Kakitsuka et al. | 398/183 |
| 2005/0152702 A1 | * | 7/2005 | Mahgerefteh et al. | 398/159 |
| 2011/0064419 A1 | * | 3/2011 | Chen et al. | 398/149 |

OTHER PUBLICATIONS

Madsen et al, Multistage dispersion compensator usign ring resonators, Nov. 1999, Optics Letters, vol. 24, pp. 1555-1557.*
Xiang et al, A high performance RF lightwave transmitter for analog fibers, Nov. 2000, Lasers and Electro-Optics Society , vol. 1, pp. 138-139.*

\* cited by examiner

*Primary Examiner* — Ken Vanderpuye
*Assistant Examiner* — Dibson Sanchez
(74) *Attorney, Agent, or Firm* — Maschoff Brennan

(57) ABSTRACT

In an embodiment, an optical communication system includes an optical transmitter and an optical discriminator. The optical transmitter is configured to emit a frequency modulated signal having a bit rate frequency and a frequency excursion between 20% and 80% of the bit rate frequency. The optical discriminator is configured to convert the frequency modulated signal to a substantially amplitude modulated signal and includes a delay line interferometer (DLI). The DLI includes an input, an output, a first optical path coupling optical signals from the input to the output and a second optical path coupling optical signals from the input to the output. The first and second optical paths have different lengths.

29 Claims, 23 Drawing Sheets

OPTICAL FILTER FOR USE IN A LASER TRANSMITTER

CROSS-REFERENCE TO RELATED APPLICATIONS

This application claims the benefit of and priority to U.S. Patent Application Ser. No. 61/441,362, filed Feb. 10, 2011, which is incorporated herein by reference.

BACKGROUND

1. Field of the Invention

Some embodiments disclosed herein relate to laser transmitters. More particularly, example embodiments relate to optical filters for use in laser transmitters.

2. Related Technology

Fiber optic communication systems use a variety of transmitters to convert electrical digital bits of information into optical signals that are sent through optical fibers. On the other end of the optical fiber is a receiver that converts the optical signal to an electrical signal. The transmitters modulate the signals to form bits of 1s and 0s so that information or data may be carried through the optical fiber. There are a variety of transmitters that modulate the signal in different ways. For example, there are directly modulated transmitters and indirectly modulated transmitters. The directly modulated transmitters offer a compact system having large response to modulation and are integrateable. The directly modulated transmitters are also generally less expensive than the externally modulated transmitters, which require an intensity modulator, usually LiNbO3, following the laser. One of the drawbacks of a directly modulated transmitter, however, is that its output is highly chirped. Chirp is the rapid change in optical frequency or phase that accompanies an intensity modulated signal. Chirped pulses become distorted after propagation through tens of km of dispersive optical fiber, increasing system power penalties to unacceptable levels.

An alternative to directly modulating the laser source is using a laser source that produces a partially frequency modulated signal and an optical discriminator as discussed in UK Patent GB2107147A by R. E. Epworth. In this technique, the laser is initially biased to a current level high above threshold. A partial amplitude modulation of the bias current is applied so that the average power output remains high. The partial amplitude modulation also leads to a partial but significant modulation in the frequency of the laser output, synchronous with the power amplitude changes. This partially frequency modulated output may then be applied to a filter, such as a Fabry Perot filter, which is tuned to allow light only at certain frequencies to pass through. This way, a partially frequency modulated signal is converted into a substantially amplitude modulated signal. That is, frequency modulation is converted into amplitude modulation. This conversion increases the extinction ratio of the input signal and further reduces the chirp.

Since Epworth, it has also been recognized that a frequency-modulated transmitter with a frequency discriminator produces an output with lower chirp, which reduces the pulse distortion upon propagation through a communication fiber. Chirp is a time dependent frequency variation of an optical signal and generally increases the optical bandwidth of a signal beyond the Fourier-transform limit. Chirp can either improve or degrade the optical pulse shape after propagation through a dispersive medium, depending on the sign and exact nature of the chirp. In the conventional directly modulated laser transmitter, chirp causes severe pulse distortion upon propagation through the optical fiber. This is because the speed of light in the dispersive medium is frequency dependent, frequency variations of pulses may undergo different time delays, and thus the pulse may be distorted. If the propagation distance through the medium is long as in the case of optical fibers, the pulse may be dispersed in time and its width broadened, which has an undesirable effect.

A frequency-modulated transmitter with a frequency discriminator is particularly suited for long range applications where the reduced bandwidth of the signal reduces the amount of distortion caused by many kilometers of dispersive fiber. However, in short range applications (e.g. the "back to back" or "BB" arrangement) and long range systems having dispersion compensation, the reduced bandwidth results in an output with slower rise and fall times. The slower rise and fall times reduce the size of the data "eye," making detection of 0 bits and 1 bits more difficult and increasing the error rate.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

In general, example embodiments of the invention relate to optical filters for use in laser transmitters.

In an example embodiment, an optical communication system includes an optical transmitter and an optical discriminator. The optical transmitter is configured to emit a frequency modulated signal having a bit rate frequency and a frequency excursion between 20% and 80% of the bit rate frequency. The optical discriminator is configured to convert the frequency modulated signal to a substantially amplitude modulated signal and includes a delay line interferometer (DLI). The DLI includes an input, an output, a first optical path coupling optical signals from the input to the output and a second optical path coupling optical signals from the input to the output. The first and second optical paths have different lengths.

In another example embodiment, a method includes modulating an optical signal source according to a data signal to produce a frequency modulated signal. The frequency modulated signal includes high frequency portions encoding a first bit value and low frequency portions encoding a second bit value. The high and low frequency portions are separated by a frequency excursion between 20% and 80% of a bit rate frequency of the frequency modulated signal. The method also includes transmitting the frequency modulated signal through an optical discriminator to convert the frequency modulated signal to a substantially amplitude modulated signal. The optical discriminator includes a DLI. The DLI includes an input, an output, a first optical path coupling optical signals from the input to the output and a second optical path coupling optical signals from the input to the output. The first and second optical paths have different lengths.

These and other aspects of example embodiments will become more fully apparent from the following description and appended claims.

BRIEF DESCRIPTION OF THE DRAWINGS

To further clarify various aspects of some embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
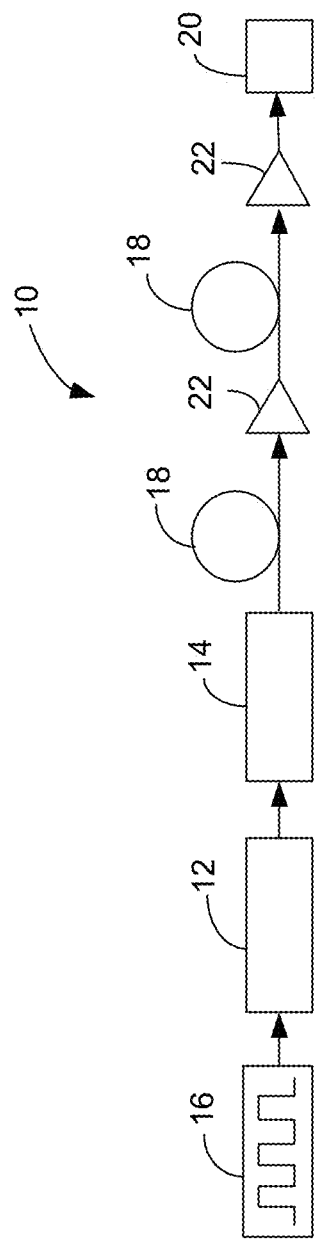
FIG. 1 is a schematic block diagram of an optical communication system including a laser and an optical spectrum reshaper (OSR) in accordance with some embodiments.

Referring to FIG. 1, an optical communication system 10 includes a laser 12 that emits a frequency modulated signal that is received by an optical spectrum reshaper (OSR) 14. The frequency modulated signal encodes data from a data source 16 electrically coupled to the laser 12. The output of the OSR 14 is coupled to an optical fiber 18 that transmits the output to an optical receiver 20. In some embodiments, one or more dispersion compensating elements 22 may be used to compensate for dispersion within the fiber 18 of the transmitted signal.

In some embodiments, the output of the laser 12 is both frequency and amplitude modulated, such as adiabatically chirped pulses produced by a directly modulated laser 12 embodied as a distributed feedback (DFB) laser, distributed Bragg reflector (DBR) laser, or other semiconductor laser. The output of the OSR 14 may also remain somewhat frequency modulated.

Figure 2:
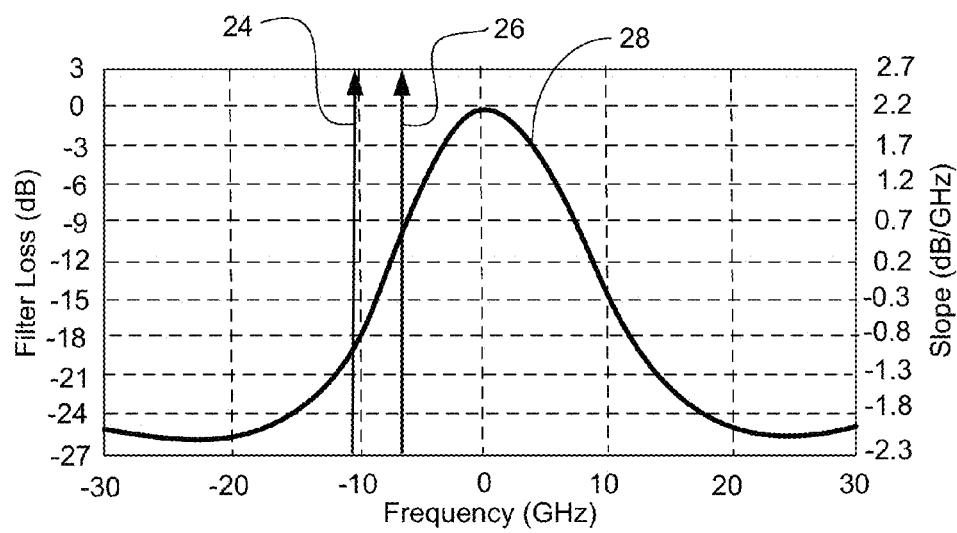
FIG. 2 graphically illustrates an example transmission function of the OSR of FIG. 1 relative to characteristic frequencies of a frequency modulated signal such as may be emitted by the laser of FIG. 1.

Referring to FIG. 2, the output of the laser 12 may include low frequency portions and high frequency portions encoding binary zeros and ones, respectively. The low frequency portions and high frequency portions may define zero center frequency 24 and one center frequency 26, respectively. For purposes of this disclosure the zero frequency portion refers to portions of a signal having a center frequency equal to the zero center frequency 24 (i.e. the frequency during a bit having the least optical energy) whereas the one frequency portions refer to portions of a signal having the one center frequency 26.

The one center frequency 26 is preferably located at a point on the transmission function 28 of the OSR 14 that has greater transmission than the location of the zero center frequency 24. In some embodiments, this includes positioning the one center frequency 26 on a positive slope portion of the transmission function 28.

Figure 3:
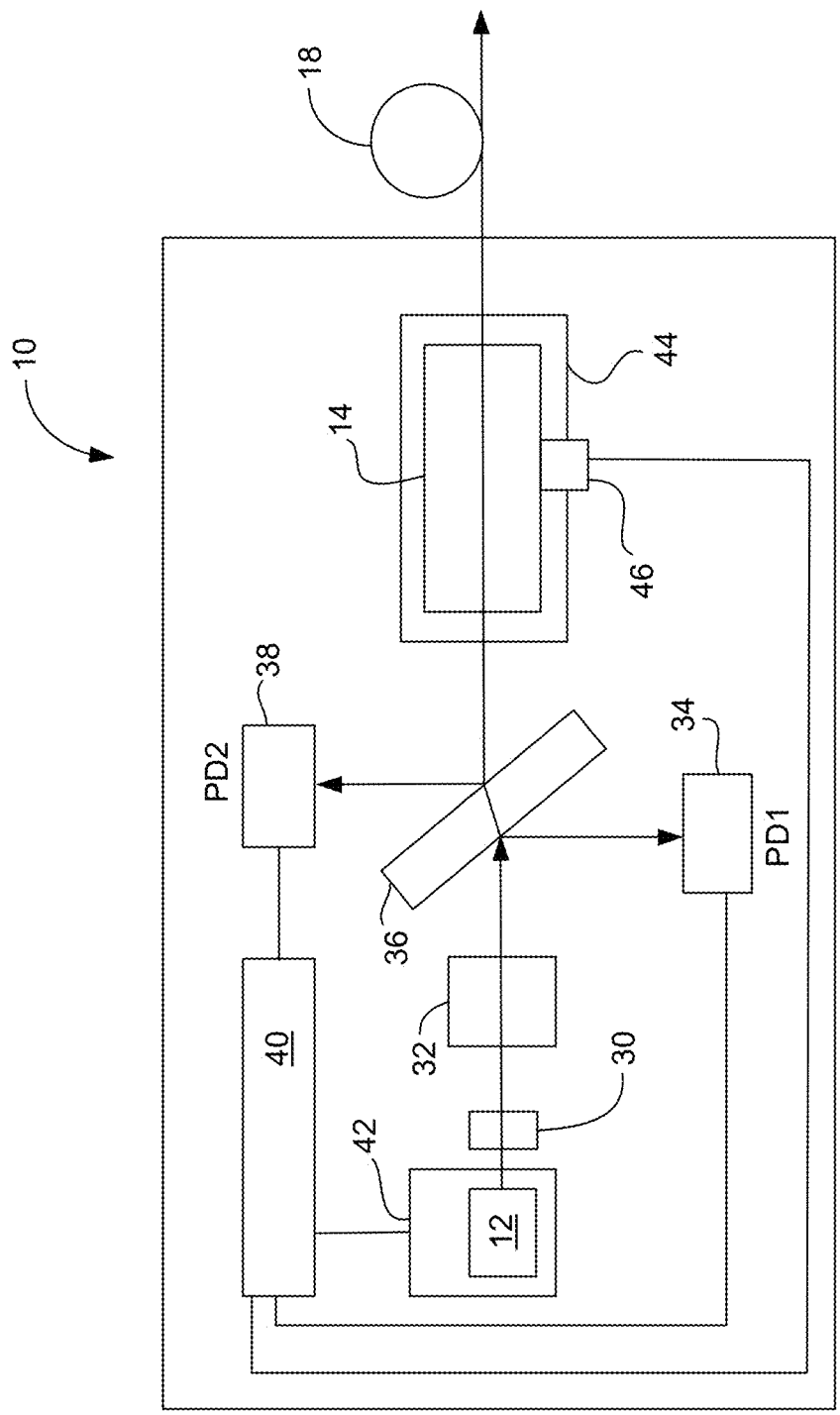
FIG. 3 is a schematic block diagram of a structure for locking the wavelength of the laser of FIG. 1 according to some embodiments.

Referring to FIG. 3, in some embodiments, the OSR 14 located between the laser 12 and the fiber 18 may be used to control the wavelength of the laser 12. For example, a collimating lens 30 is used to direct a collimated beam from the laser 12 through an isolator 32. A small fraction (typically 5%) of light from the laser is re-directed to a photodetector 34 by a tap beam splitter 36. The tap beam splitter 36 may be produced by depositing an anti-reflection coating on one side of a small piece of polished glass and a second controlled-reflection coating on the opposite side.

In some embodiments of the invention, the portion of the collimated beam passing through the tap beam splitter 36 is incident on the OSR 14. The spectral response of the OSR 14 may be such that non-transmitted light is reflected. Therefore, depending on the location of the lasing wavelength relative to the passband of the OSR 14, a portion of the incident optical beam will be transmitted while a residual portion of the incident beam is reflected. The reflected portion of the beam passes back through the tap beam splitter 36 and a portion of the power, such as about 5%, is diverted onto a second photodetector 38, as shown in FIG. 3.

The frequency alignment between the laser 12 and the OSR 14 is generally implemented by a controller 40 that compares the average optical power before and after the OSR 14. For example, the ratio of photo currents produced by photodetectors 34, 38 may be used to "lock" the relative spectral positions of the laser 12 with respect to the response of the OSR 14. During calibration, the optimal set point for the laser wavelength relative to the OSR spectral response is determined. During operation, the controller 40 then acts to maintain the laser wavelength near this calibrated set point by continuously adjusting the laser temperature via a thermoelectric cooler (TEC) 42 to which it is coupled in response to the currents produced by the photodetectors 34, 38. For example, if the lasing wavelength changes, the ratio of the photo current signals provides an error signature allowing the controller 40 coupled to the TEC 42 to re-adjust the DFB temperature to maintain the correct wavelength.

In some embodiments, the controller 40 controls the temperature of the OSR 14 to avoid wavelength drift. For example, the temperature of the OSR 14 may be held substantially constant by controlling power to a TEC 44. The controller 40 may receive an output from a temperature sensor 46 in thermal contact with the OSR 14 in order to control power to the TEC 44 and maintain the OSR 14 at a constant pre-calibrated temperature.

Figure 4A:
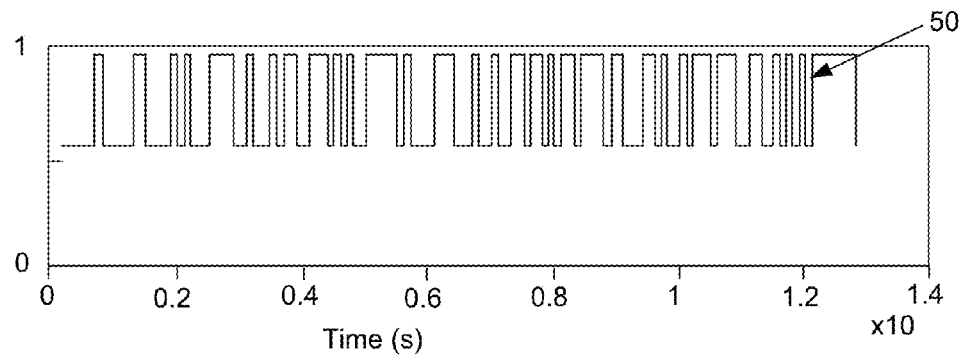
FIG. 4A illustrates an example optical signal such as may be emitted by the laser of FIG. 1.
Figure 4B:
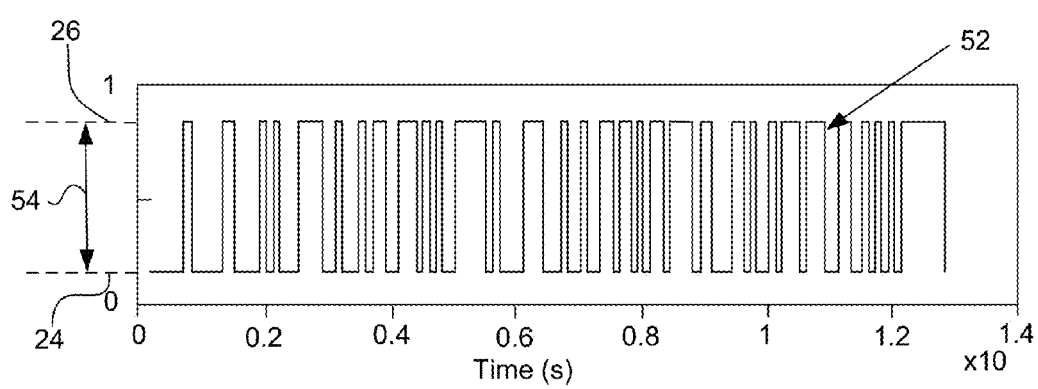
FIG. 4B depicts a frequency modulation profile corresponding to the example optical signal of FIG. 4A.
Figure 4C:
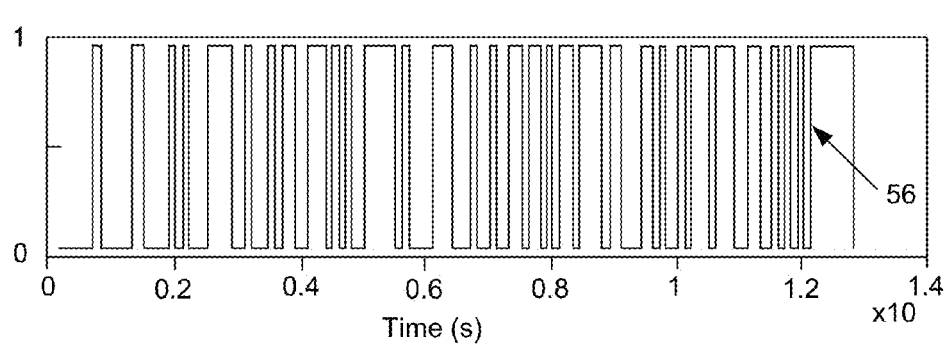
FIG. 4C illustrates the example optical signal of FIG. 4A after transmission through the OSR of FIG. 1.

Referring to FIGS. 4A through 4C, in operation the data source 16 modulates the laser 12 to produce a frequency and amplitude modulated signal 50 having a bit period T and a corresponding bit rate frequency 1/T. As shown in FIG. 4B, the signal 50 has a frequency modulation profile 52 in which the signal 50 is modulated between the zero frequency 24 and the one frequency 26. The difference between the zero frequency 24 and one frequency 26 may be referred to as the frequency excursion 54 of the signal 50. The signal 50 is transmitted through the OSR 14, which outputs a signal 56 having increased amplitude modulation relative to the signal 50. For example, the signal 50 may have an extinction ratio of between 2 and 4 dB, whereas the signal 56 has an extinction ratio of greater than 10 dB.

The frequency excursion 54 may also be referred to as adiabatic chirp. In some embodiments, the data source 16 modulates the laser 12 such that the frequency excursion 54, or adiabatic chirp, is between 20% to 80% of the bit rate frequency, or between 25% to 75% of the bit rate frequency. By way of example only, the frequency excursion 54 or adiabatic chirp may be between 2 gigahertz (GHz) to 8 GHz for a 10 gigabit per second (Gb/s) bit rate frequency, or between 2.5 GHz to 7.5 GHz for a 10 Gb/s bit rate frequency. Modulating the laser 12 such that the frequency excursion 54 or adiabatic chirp is in the foregoing range(s) may increase the reach of the laser 12 in dispersive optical fiber, for example. Alternately or additionally, modulating the laser 12 such that the frequency excursion 54 or adiabatic chirp is in the foregoing range(s) may significantly suppress the optical carrier and narrow the spectrum of the optical carrier.

Figure 5:
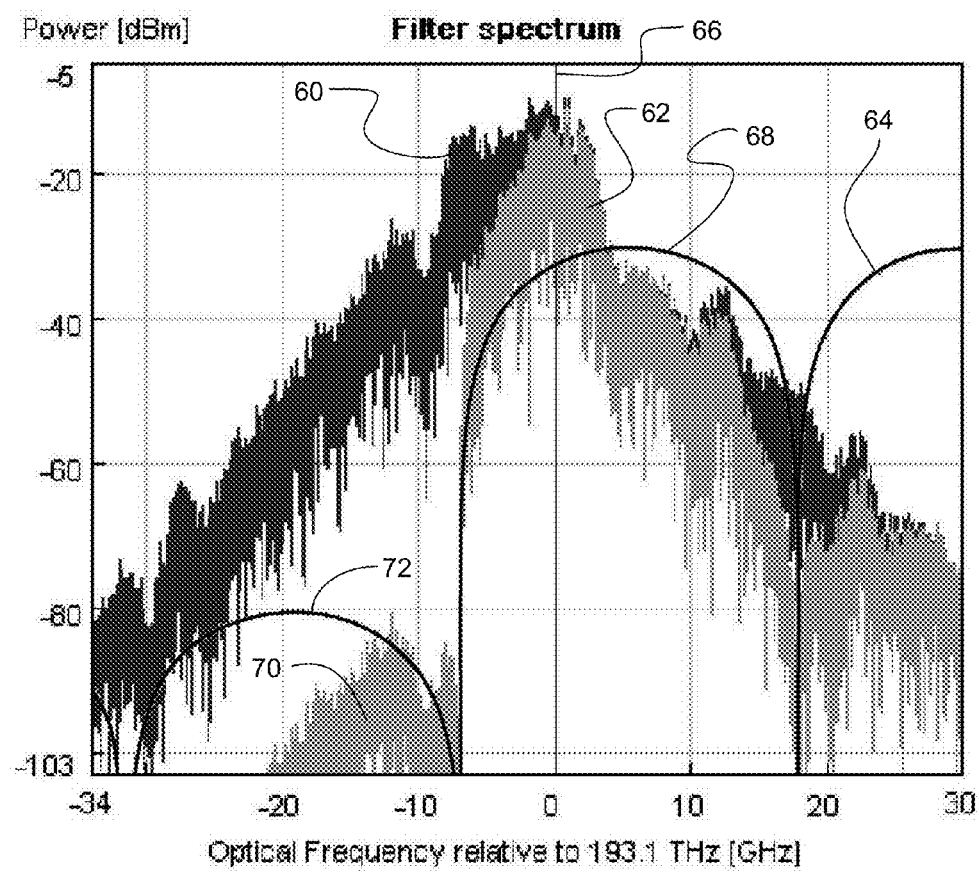
FIG. 5 includes example optical spectra corresponding to the output of the laser of FIG. 1 before and after transmission through the OSR of FIG. 1.

Referring to FIG. 5, the output of the laser 12 has a spectrum 60 prior to input to the OSR 14 and the output of the OSR 14 has a different spectrum 62 in which lower frequencies are more attenuated relative to the spectrum 60. As shown in FIG. 5, the OSR 14 may have a periodic transmission function 64. The illustrated transmission function 64 corresponds to a delay line interferometer having a sinusoidal transmission function (note FIG. 5 illustrates a sinusoidal transmission function on a logarithmic scale). As shown in FIG. 5, a center frequency 66 of the laser 12 spectrum 60 lies on a first transmission peak 68 of periodic transmission function 64, whereas low sideband 70 lies on a different transmission peak 72 of periodic transmission function 64 that has been artificially suppressed to simulate the effect of attenuation of the low sideband 70.

Figure 6A:
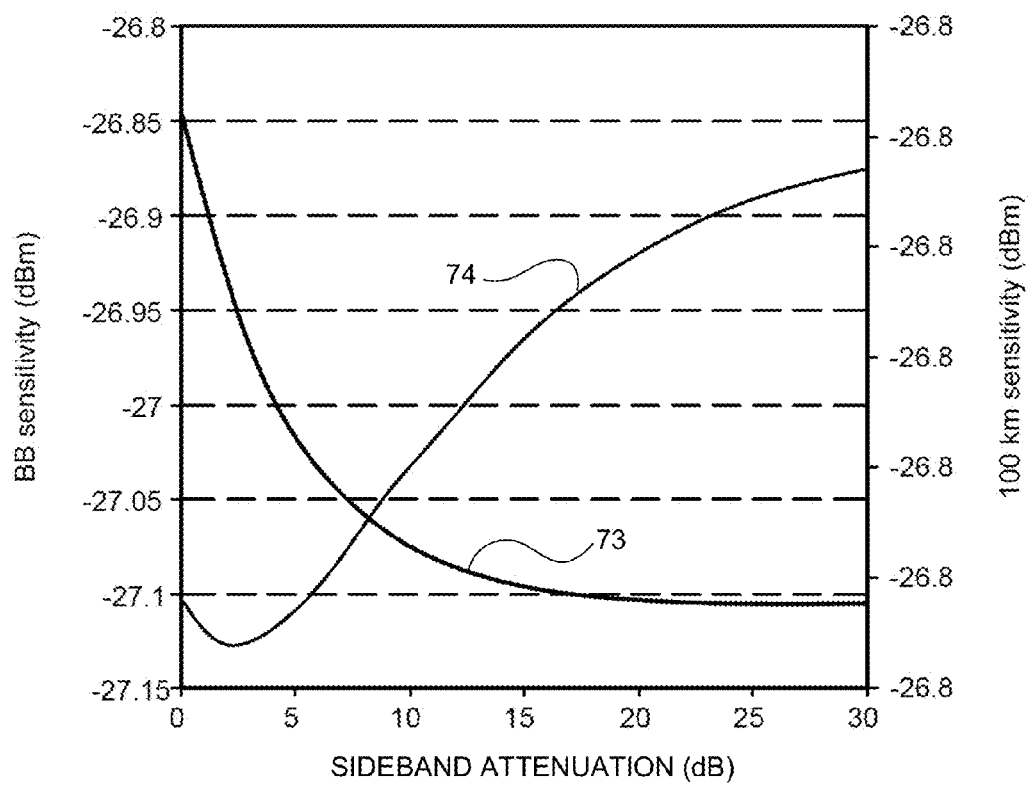
FIGS. 6A-6C illustrate the effect of sideband attenuation on the performance of the laser and OSR of FIG. 1.
Figure 6B:
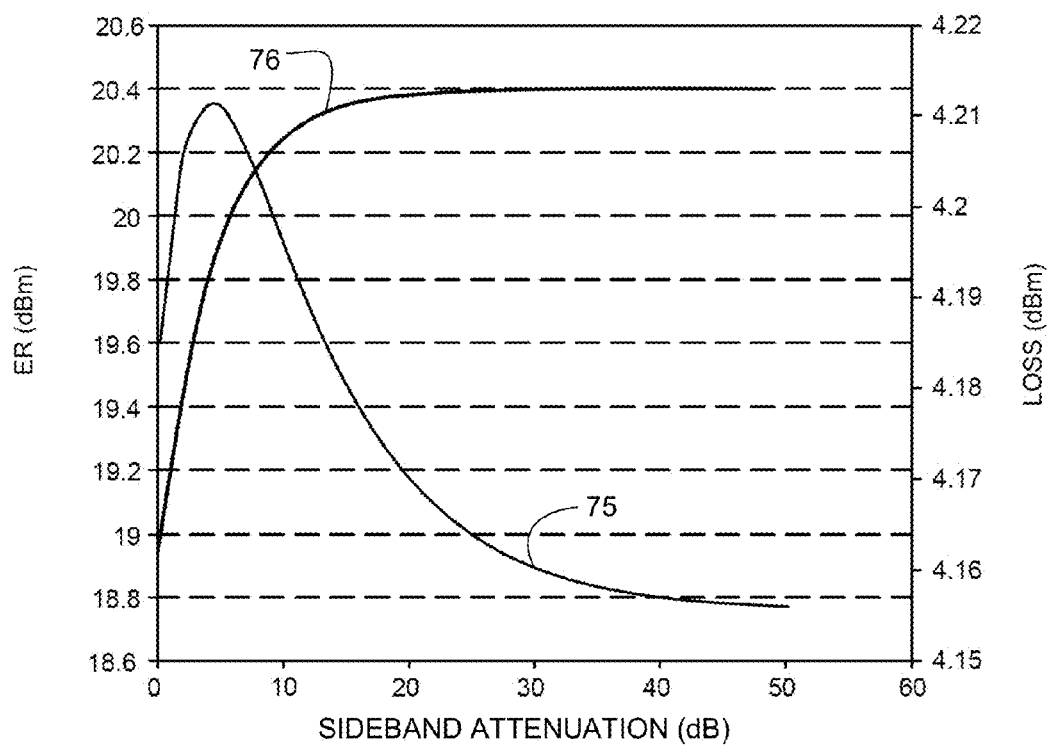
Figure 6C:
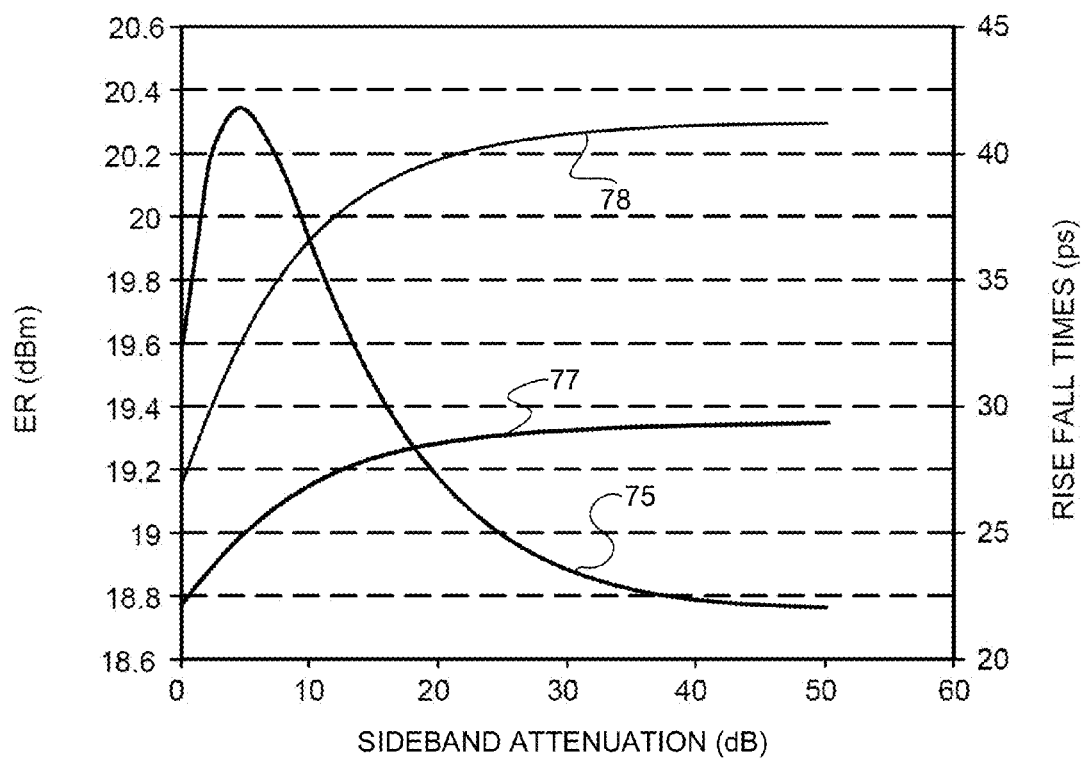

FIGS. 6A through 6C illustrate the effect of sideband attenuation on the performance of combined laser 12 and OSR 14. Referring specifically to FIG. 6A, it is apparent that increasing attenuation of the low frequency sideband results in improved sensitivity (measured in dBm) 73 measured after transmission through 100 km of optical fiber. It is also apparent that increasing attenuation of the low frequency sideband does not significantly degrade back-to-back (BB) sensitivity 74 for attenuation less than about 10 dB. Referring specifically to FIG. 6B, for high attenuation (e.g. above about 10 dB) of the low frequency sideband, BB extinction ratio (ER) 75 degrades significantly, whereas loss 76 does not increase significantly for high attenuation (e.g. above 10 dB). Referring specifically to FIG. 6C, attenuation of the low frequency sideband increases the BB rise time 77 and fall time 78. As shown in FIG. 6C, the BB fall time 78 is significantly more affected than the rise time.

Figure 7A:
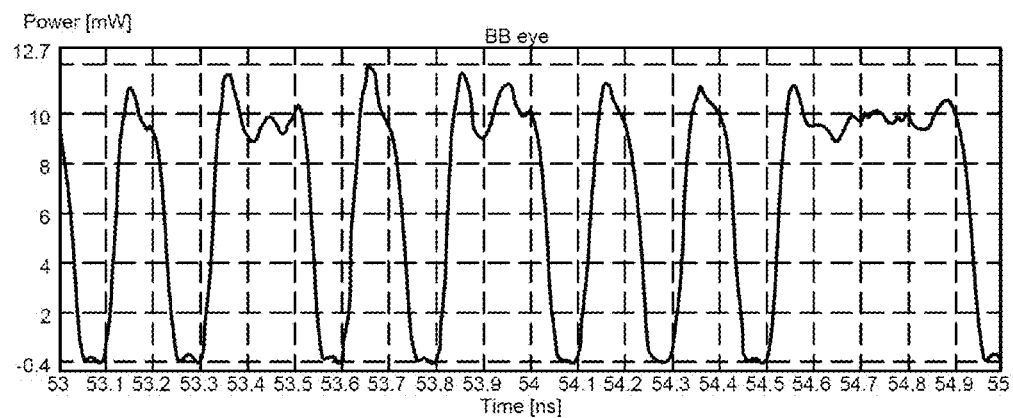
FIGS. 7A-7B illustrate amplitude modulation and phase of a signal following transmission through an OSR embodied as a delay line interferometer (DLI)
Figure 7B:
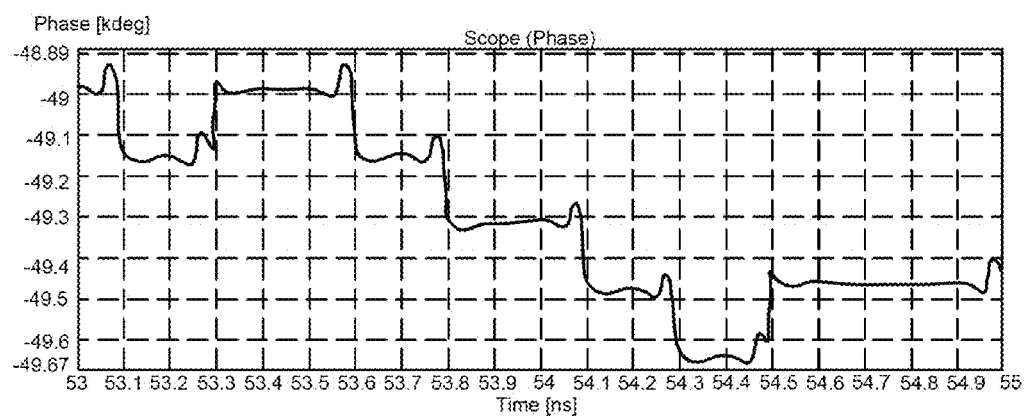

FIG. 7A illustrates amplitude modulation and FIG. 7B illustrates phase of a signal following transmission through an OSR 14 embodied as a DLI having a free spectral range (FSR) of 25 GHz. As is readily apparent, the profile of the amplitude and phase is somewhat noisy with transient peaks at zero-to-one transitions.

Figure 8A:
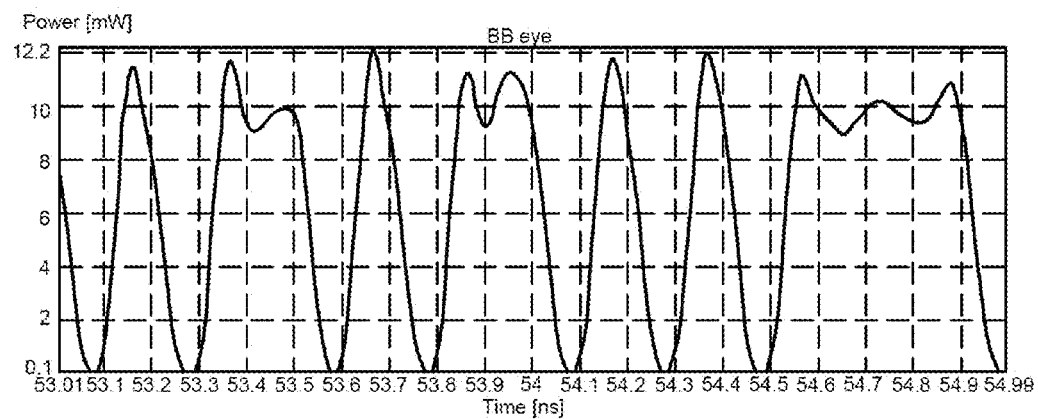
FIGS. 8A-8B depict amplitude modulation and phase of a signal following transmission through an OSR embodied as a DLI and having low frequency sideband attenuation.
Figure 8B:
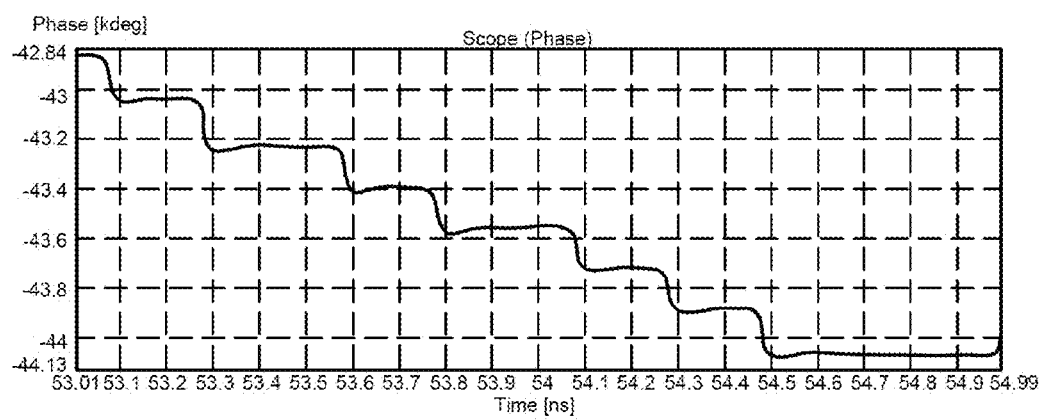

FIG. 8A illustrates amplitude modulation and FIG. 8B illustrates phase of a signal following transmission through an OSR 14 embodied as a DLI having an FSR of 25 GHz and having the low frequency sideband attenuated by 50 dB. As is readily apparent from FIGS. 7A-8B, the profile of the amplitude and phase is substantially smoother for a signal following transmission through the OSR 14 of FIGS. 8A-8B as compared to a signal following transmission through the OSR 14 of FIGS. 7A-7B. In particular, transient peaks on the zero-to-one transitions are reduced. The phase is substantially more constant across the duration of individual bits. The more constant phase results in improved destructive interference between one bits separated by an odd number of zero bits for a frequency excursion about equal to one half the bit rate. Destructive interference between one bits separated by an odd number of zero bits reduces the error rate for signals transmitted over long distances inasmuch as spreading of the one pulses into the zero bit due to dispersion will be counteracted by destructive interference between the one pulses.

As is apparent from FIGS. 6A through 6C, FIGS. 7A and 7B, and FIGS. 8A and 8B, attenuation of the low frequency sideband can improve long range transmission performance. However, attenuation of the low frequency sideband can also degrade back-to-back performance. Various optical discriminators are described herein that are suitable for use as an OSR 14 and which provide levels of sideband attenuation and other properties resulting in improved performance.

Figure 9A:
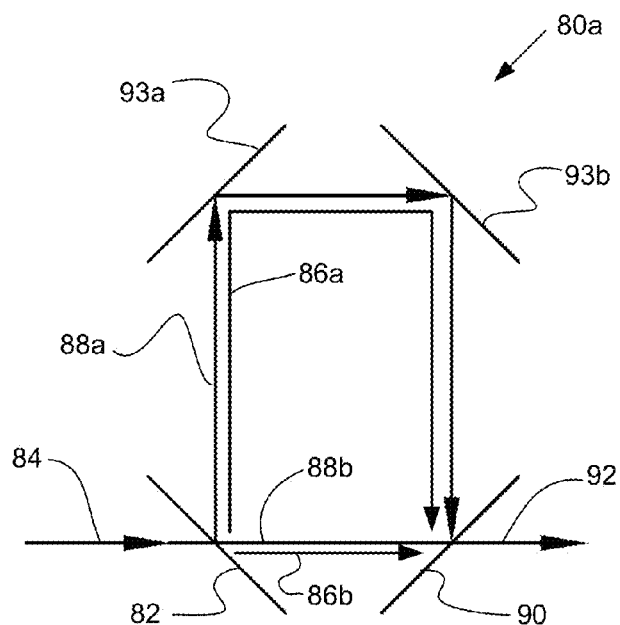
FIGS. 9A-9B are examples of DLIs that can be implemented in the OSR of FIG. 1.

Referring to FIG. 9A, an OSR 14 may incorporate a delay line interferometer 80a. In the illustrated embodiment, the DLI 80a includes a first beam splitter 82 for directing portions of an input beam 84 onto a first path 86a and a second path 86b. The first path 86a directs a first portion 88a of the input beam 84 from the splitter 82 toward a combiner 90. The second path 86b directs a second portion 88b of the input beam 84 from the splitter 82 toward the combiner 90. The combiner 90 combines the first portion 88a and second portion 88b into an output beam 92.

In the illustrated embodiment, the beam splitter 82 and combiner 90 are embodied as partially reflective mirrors oriented at a 45 degree angle relative to the optical axis of the input beam 84. However, other beam splitters 82 may be used, such as fiber couplers or optical couplers formed in a planar lightwave circuit (PLC).

The first path 86a includes means for guiding the first portion 88a of the input beam 84 along the first path 86a that has a length different than the second path 86b. For example, the first path 86a may include one or more mirrors 93a, 93b positioned and oriented to direct light from the splitter 82 toward the combiner 90. In other embodiments, the first path 86a may include a length of optical fiber or an optical path defined in a planar lightwave circuit (PLC).

The second path 86b may be embodied as the distance between the splitter 82 and combiner 90 such that the second portion 88b of input beam 84 travels directly from the splitter 82 to the combiner 90 without intervening optical components.

Figure 9B:
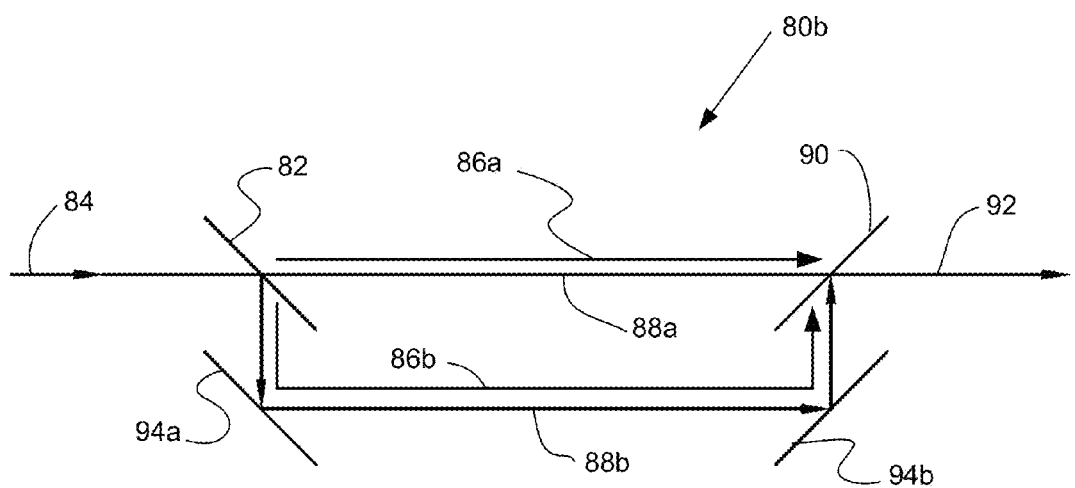

FIG. 9B illustrates an alternative embodiment of a DLI 80b in which one or more mirrors 94a, 94b may be used to define the second path 86b that has a different length than the first path 86a. In other embodiments, the second path 86b may be embodied as a length of optical fiber or an optical waveguide formed in a planar lightwave circuit (PLC).

Figure 9C:
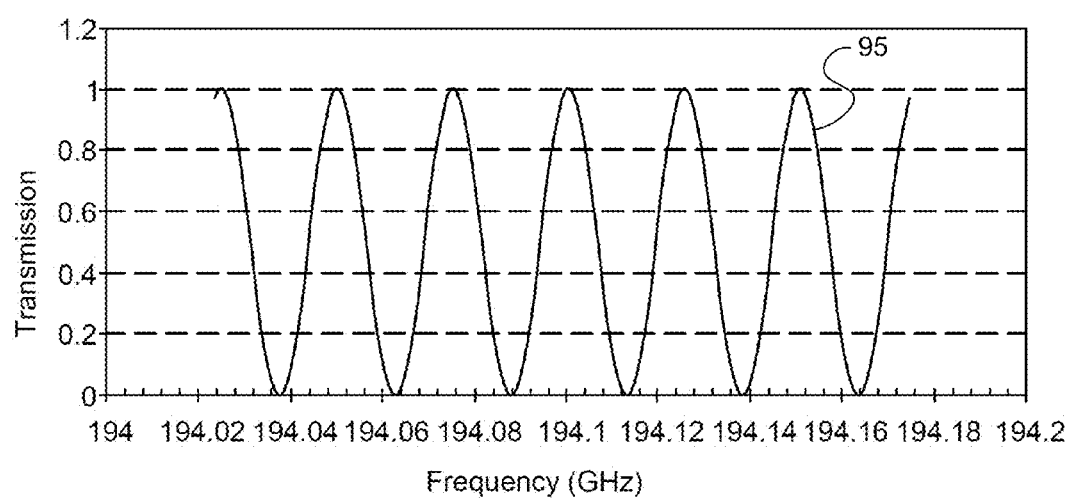
FIG. 9C is a plot of an example transmission function of the DLI of FIG. 9A.

Referring to FIG. 9C, the first path 86a and second path 86b of DLI 80a have different lengths that result in the output beam 92 having a frequency dependent transmission function 95 resulting from interference between the first and second portions 88a, 88b. DLI 80b exhibits a similar frequency dependent transmission function to that shown in FIG. 9C. As shown in FIG. 9C, the transmission function 95 has a plurality of periodic transmission peaks. The separation between the peaks, or free spectral range (FSR), is determined by the difference in the path length of the first and second paths 86a, 86b.

In some embodiments, the FSR of the DLI 80a or 80b is within a range of 15-50 GHz. Alternately or additionally, the FSR of the DLI 80a or 80b is within a range of 20-25 GHz. In some embodiments, the FSR of the DLI 80a or 80b in a dense wavelength division multiplexing (DWDM) network is selected as 50/n or 100/n, where n is an integer. Alternatively, in time division multiplexing (TDM) networks, the FSR can be virtually any FSR. In these and other embodiments disclosed herein, it will be appreciated, with the benefit of the present disclosure, that as FSR increases, the attenuation of higher sidebands may increase, resulting in increased rise/fall time, reduced mask margin, and/or reduced dispersion penalty of a transmitted signal.

As described below, various embodiments are disclosed that incorporate one or more optical elements into a DLI in order to form an OSR 14 having specific properties. In such embodiments, reference to the FSR of the DLI refers to the FSR of the DLI in the absence of other optical components as determined by the difference in path length between first and second paths between a splitter and a combiner.

Figure 10A:
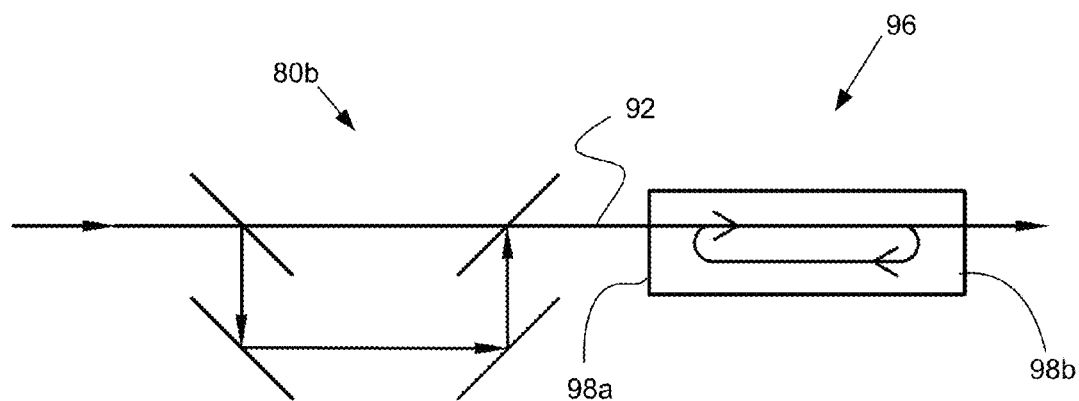
FIG. 10A is an example of a DLI and filter that can be implemented in the OSR of FIG. 1.

Referring to FIG. 10A, in some embodiments an OSR 14 includes a DLI 80b as in FIG. 9B that produces an output beam 92 that is passed through a filter such as an etalon 96. The etalon 96 may be single- or multi-cavity etalon. The etalon 96 includes an input face 98a and an output face 98b. In some embodiments, the faces 98a, 98b have reflectivities of between about 20% and 40%. In other embodiments, the faces 98a, 98b have reflectivity of between about 25% and 35%. In still other embodiments, the faces 98a, 98b have reflectivity of about 30%.

Figure 10B:
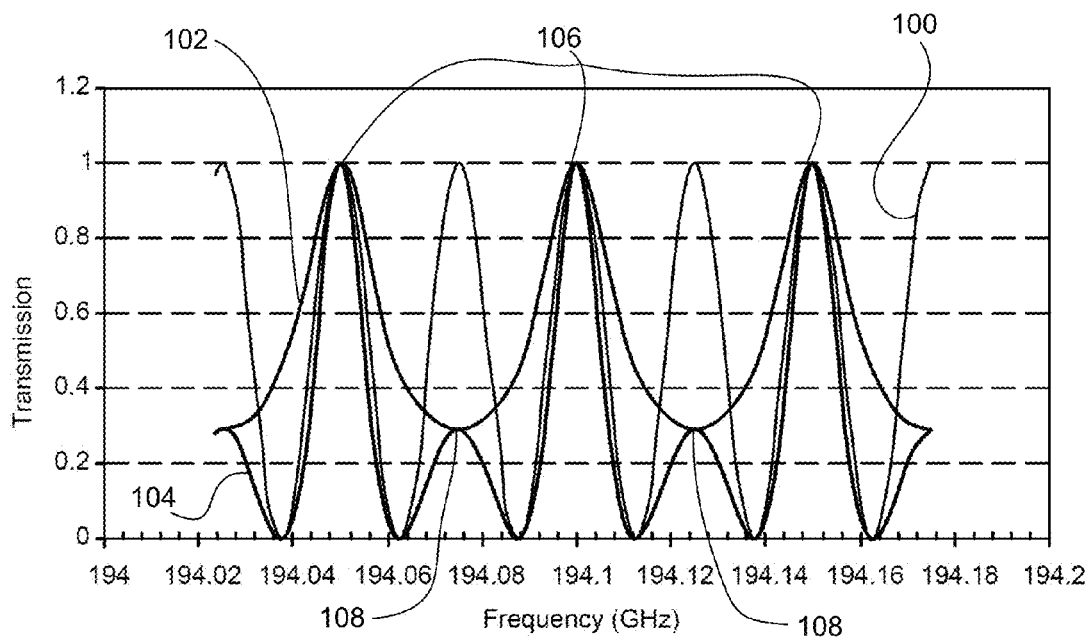
FIG. 10B is a plot of example transmission functions associated with the DLI and filter of FIG. 10A.

Referring to FIG. 10B, the DLI 80b has a transmission function 100 with respect to frequency and the etalon 96 has a transmission function 102 with respect to frequency. The illustrated transmission function 102 is for an etalon 96 having faces 98a, 98b having reflectivities of 30%. It is readily apparent that the etalon 96 has a FSR that is about twice that of the DLI 80. For example, the FSR of the etalon 96 may be between 1.9 and 2.1 times the FSR of the DLI 80. A combined transmission function 104 of the DLI 80 and etalon 96 includes alternating high peaks 106 and low peaks 108. The low peaks 108 may have a peak transmission between about 1 and 10 dB lower than the peak transmission of the high peaks 106. In some embodiments, the low peaks 108 are between 1.5 and 3.5 dB lower than the high peaks 106. The zero frequency 24 (FIG. 2) of a signal passed through the OSR 14 of FIG. 10A may be located at the local minimum between a negative slope portion of a low peak 108 and a positive slope portion of a high peak 106. The one frequency 26 (FIG. 2) may be located on a positive slope portion of a high peak 106 or at the peak transmission frequency of a high peak 106.

The low frequency sideband of a signal transmitted through the OSR 14 of FIG. 10A will experience some attenuation due to the lower peak transmission of the low peaks 108, however the illustrated OSR 14 provides the advantage of attenuating the sidebands sufficiently to provide good dispersion tolerance but not to the extent that the back-to-back performance degrades significantly.

Experiments conducted by the inventor have shown that the total loss of the OSR 14 of FIG. 10A is 4.0 dB, as compared to a loss of 4.16 for the DLI 80a or 80b alone. Likewise, the loss at the one bit frequency is 1.95 dB for the OSR 14 of FIG. 10A, as compared to a loss of 2.2 dB for the DLI 80a or 80b alone. The extinction ratio (ER) is 13.6 dB for the OSR 14 of FIG. 10A, as compared to an ER of 12.9 dB for the DLI 80a or 80b alone. Accordingly, the OSR 14 of FIG. 10A including combined etalon 96 and DLI 80b provides significant improvements in performance over a conventional DLI alone.

Figure 11A:
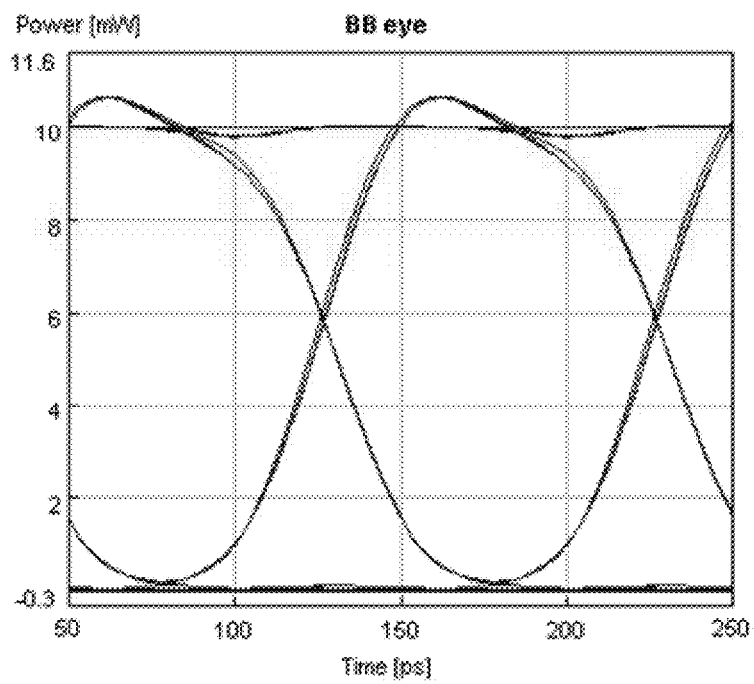
FIG. 11A illustrates an eye diagram of the back-to-back (BB) output of the DLI of FIG. 9A or 9B.
Figure 11B:
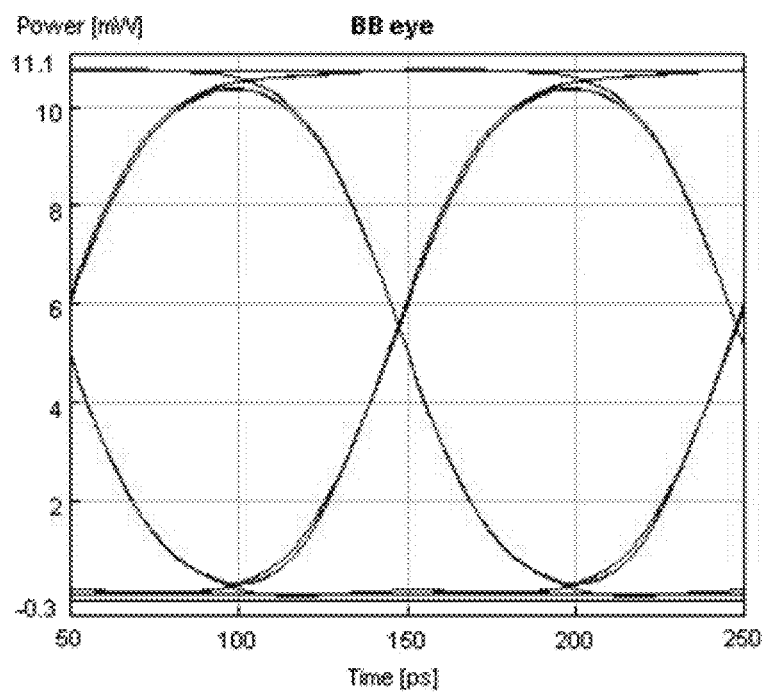
FIG. 11B illustrates an eye diagram of the BB output of the combined DLI and filter of FIG. 10A.

FIG. 11A illustrates an eye diagram of the BB output of a DLI 80a or 80b without the use of an etalon 96. FIG. 11B illustrates an eye diagram of the BB output of a DLI in combination with an etalon, such as the DLI 80a or 80b and etalon 96 of FIG. 10A having faces 98a, 98b having reflectivities of greater than 40%. It is apparent that the eye of FIG. 11B is only slightly more closed than the eye of FIG. 11A.

Figure 12A:
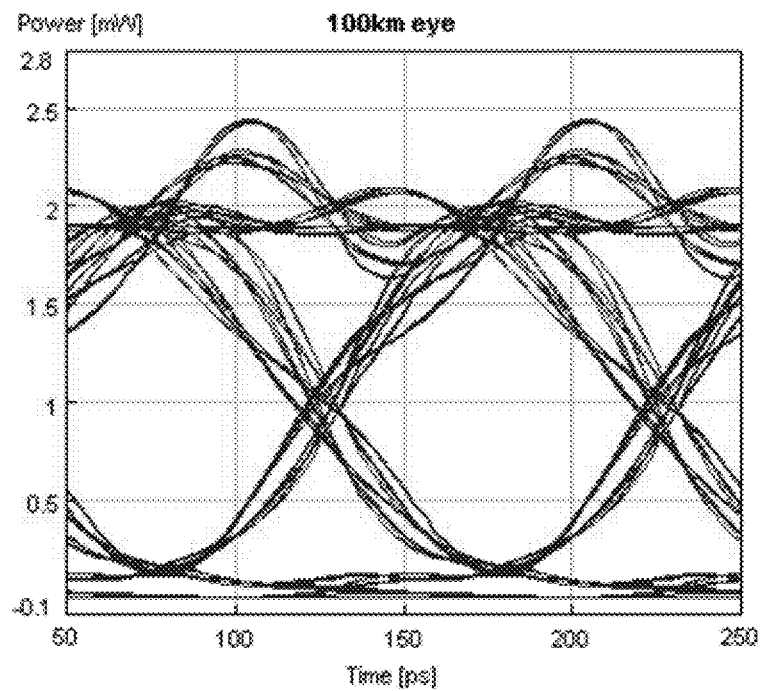
FIG. 12A illustrates an eye diagram of the output of the DLI of FIG. 9A or 9B after transmission through 100 km of optical fiber.
Figure 12B:
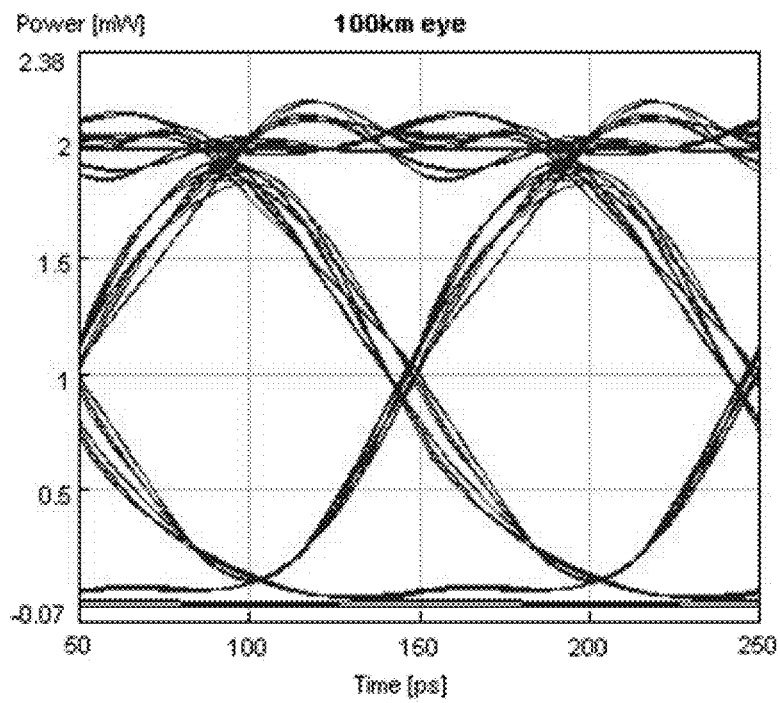
FIG. 12B illustrates an eye diagram of the output of the combined DLI and filter of FIG. 10A after transmission through 100 km of optical fiber.

FIG. 12A illustrates an eye diagram of the output of a DLI 80a or 80b without the use of an etalon 96 after transmission through 100 km of optical fiber. FIG. 12B illustrates an eye diagram of the output of a DLI in combination with an etalon after transmission through 100 km of fiber. As is readily apparent, the eye of FIG. 12B is substantially more open than the eye of FIG. 12A. Accordingly, the OSR 14 of FIG. 10A enables improvement of long distance transmission performance without significantly degrading back-to-back performance as illustrated in FIGS. 11A-12B. Various other embodiments of an OSR 14 are disclosed below that may similarly improve long distance transmission performance without significantly degrading back-to-back performance as illustrated by FIGS. 11A-12B.

Figure 13A:
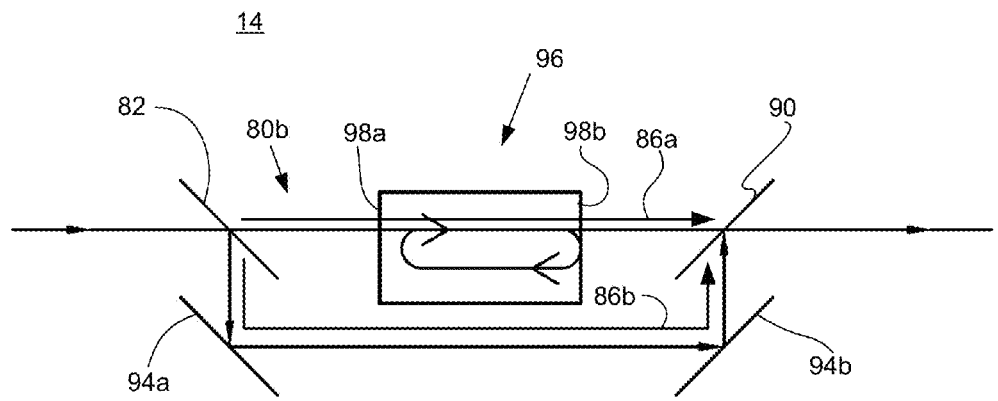
FIG. 13A is another example of a DLI and filter that can be implemented in the OSR of FIG. 1.

Referring to FIG. 13A, in an alternative embodiment of an OSR 14 including DLI 80b and etalon 96, the etalon 96 is positioned within the first path 86a of the DLI 80b. Inasmuch as the presence of the etalon 96 may alter the optical path length of the first path 86a, the first path 86a and second path 86b may have lengths such that interference peaks formed due to the difference in path length still have a FSR equal to about one half that of the etalon 96. In some embodiments, the faces 98a, 98b of the etalon 96 have reflectivities of between about 20% and 40%. In other embodiments, the faces 98a, 98b have reflectivities of between about 25% and 35%. In yet other embodiments, the faces 98a, 98b have reflectivities of about 30%.

Figure 13B:
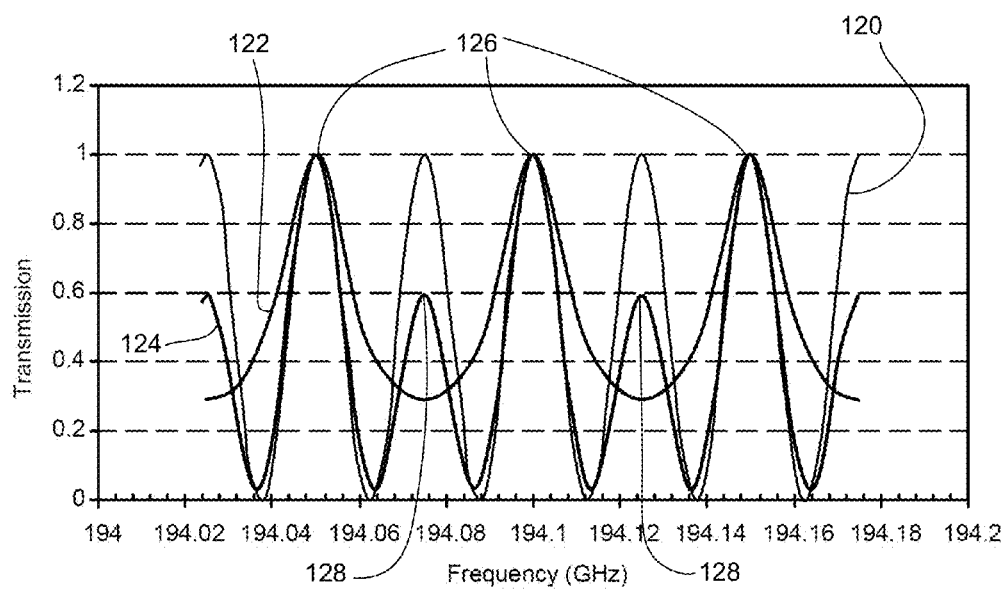
FIG. 13B is a plot of example transmission functions associated with the DLI and filter of FIG. 13A.

Referring to FIG. 13B, the DLI 80b has a transmission function 120 with respect to frequency, in the absence of the etalon 96, and the etalon 96 has a transmission function 122 with respect to frequency. The illustrated transmission function 120 is for an etalon 96 having faces 98a, 98b having reflectivities of 30%. As in the embodiment of FIG. 10A, the etalon 96 has a FSR that is about twice that of the DLI 80b. For example, the FSR of the etalon 96 may be between 1.9 and 2.1 times the FSR of the DLI 80b.

A combined transmission function 124 of the DLI 80b and etalon 96 includes alternating high peaks 126 and low peaks 128. The low peaks 128 may have a peak transmission between about 2.5 and 3.5 dB lower than the peak transmission of the high peaks 126. In some embodiments, the low peaks 128 are between about 1.5 and 4 dB lower than the high peaks 126, such as about 3 dB lower. As in the embodiment of FIG. 10A, the zero frequency 24 (FIG. 2) of a signal passed through the OSR 14 of FIG. 13A may be located at the local minimum between a negative slope portion of a low peak 128 and a positive slope portion of a high peak 126. The one frequency 26 (FIG. 2) may be located on a positive slope portion of a high peak 126 or at the peak transmission frequency of a high peak 126.

Figure 13C:
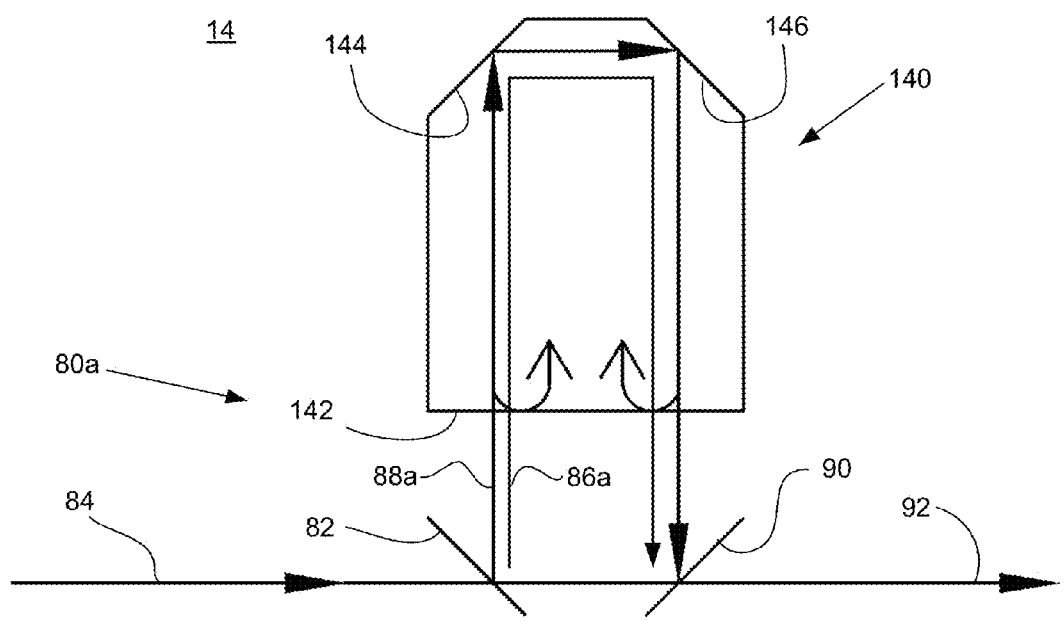
FIG. 13C is another example of a DLI and filter that can be implemented in the OSR of FIG. 1.

Referring to FIG. 13C, in another alternative embodiment, an OSR includes DLI 80a and a prism etalon 140 positioned within the first path 86a. As in the embodiment of FIG. 13A, the prism etalon 140 has a FSR that is about twice that of the DLI 80a in the absence of the prism etalon 140. The prism etalon 140 may include a first face 142 positioned to receive the first portion 88a from the splitter 82. The first face 142 may be oriented to receive light from the splitter 82 and to emit light onto the combiner 90. The first face 142 may also be oriented parallel to one or both of the input beam 84 and output beam 92. In some embodiments, the first face 142 has a reflectivity of between about 20% and 40%. In other embodiments, the first face 142 has a reflectivity of between about 25% and 35%. In yet other embodiments, the first face 142 has a reflectivity of about 30%.

The prism etalon 140 includes one or more internal reflective faces 144, 146 that direct light entering the prism etalon 140 from the splitter 82 toward the combiner 90 and also direct light circulating within the prism etalon 140 toward the first face 142 in order to achieve the wavelength-dependent transmission of the prism etalon 140.

With combined reference to FIGS. 13A-13C, in some embodiments, the transmission function of the DLI 80a of FIG. 13C in the absence of prism etalon 140 is substantially similar to the transmission function 120 of the DLI 80b of FIG. 13A in the absence of etalon 96, while the transmission function of the prism etalon 140 is substantially similar to the transmission function 122 of the etalon 96. In this example, the combined transmission function of the DLI 80a and prism etalon 140 of FIG. 13C may be substantially similar to the combined transmission function 124 of the DLI 80b and etalon 96 of FIG. 13A.

Figure 13D:
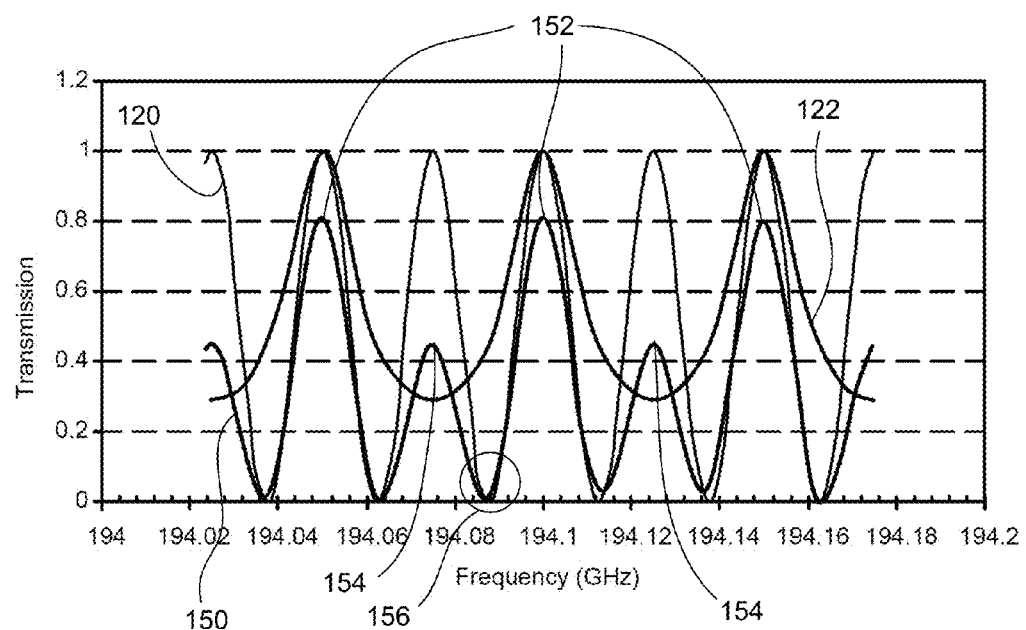
FIG. 13D is another plot of example transmission functions associated with the DLI and filter of FIG. 13A or 13C obtained by varying one or more loss parameters of the DLI and/or filter of FIG. 13A or 13C.

Alternately or additionally, and referring to FIG. 13D, while still referring to FIGS. 13A and 13C, one or more of the splitter 82, combiner 90, and mirrors 94a, 94b may have a loss, such as a loss of between 10% and 30%, or a loss of about 20%, that results in a combined transmission function 150 having high peaks 152 and low peaks 154 that are lower relative to the high peaks 126 and low peaks 128 of combined transmission function 124 shown in FIG. 13B. However, as shown in 13D, the extinction 156 at the local minima adjacent high peaks 152 is greater than for the embodiment of FIG. 13B without significant loss. For example, where one of the mirrors 94a, 94b has a loss of about 20%, the extinction 156 increases from 15 dB to 22 dB.

For the embodiment of FIG. 13C, one or both of the splitter 82 and combiner 90 may have a loss, such as a loss of between 10% and 30%, or about 20%. The embodiments of FIGS. 13A and 13C with a loss of 20% and a reflectivity of 30% for the faces 98a, 98b or first face 142 also result in low peaks 154 having a peak transmission that is about 3 dB lower than the high peaks 152, resulting in proper amounts of sideband attenuation for some applications as discussed hereinabove.

Figure 14A:
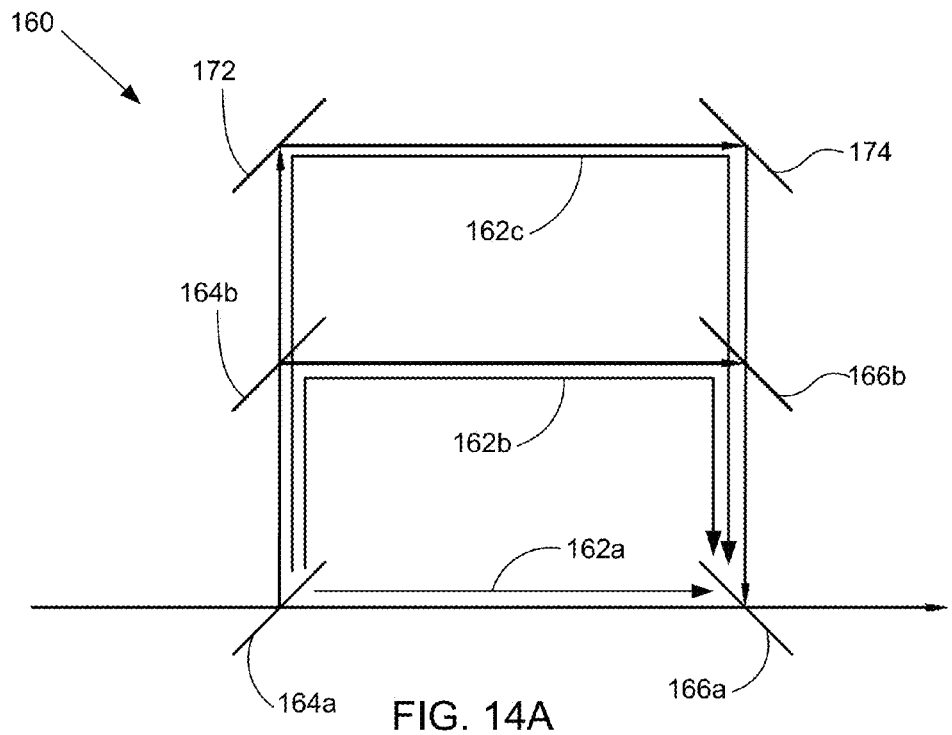
FIG. 14A is another example of a DLI that can be implemented in the OSR of FIG. 1, the DLI defining three different paths each having different lengths.

Referring to FIG. 14A, in an alternative embodiment the OSR 14 may be embodied as a DLI 160 defining three paths each having a different length. For example, the DLI 160 may define the illustrated paths 162a, 162b, and 162c, each having an optical path length that is different from the other paths. In the illustrated embodiment, the second path 162b is longer than the first path 162a and the third path 162c is longer than the second path 162b.

The DLI 160 may include a first splitter 164a and a first combiner 166a. The DLI 160 may further include a second splitter 164b and a second combiner 166b. The splitters 164a, 164b and combiners 166a, 166b may be embodied as partially silvered mirrors, fiber couplers, or other beam splitter capable of dividing an optical beam into two beams or combining two beams into a single beam, respectively. Likewise, the paths 162a-162c may include free space between the splitters 164a, 164b and combiners 166a, 166b or may be embodied as a wave guide such as an optical fiber or a waveguide formed in a PLC.

The first path 162a may extend between the first splitter 164a and the first combiner 166a. The second path 162b may extend from the first splitter 164a to the second splitter 164b to the second combiner 166b to the first combiner 166a. The third path 162c may likewise extend from the first splitter 164a to the second splitter 164b to the second combiner 166b to the first combiner 166a, where the portion of the third path 162c between the second splitter 164b and second combiner 166b is different than that of the second path 162b. For example, the third path 162c may include mirrors 172, 174 directing light from the second splitter 164b to the second combiner 166b, whereas the second path 162b includes light directed from the second splitter 164b to the second combiner 166b without intervening mirrors.

Figure 14B:
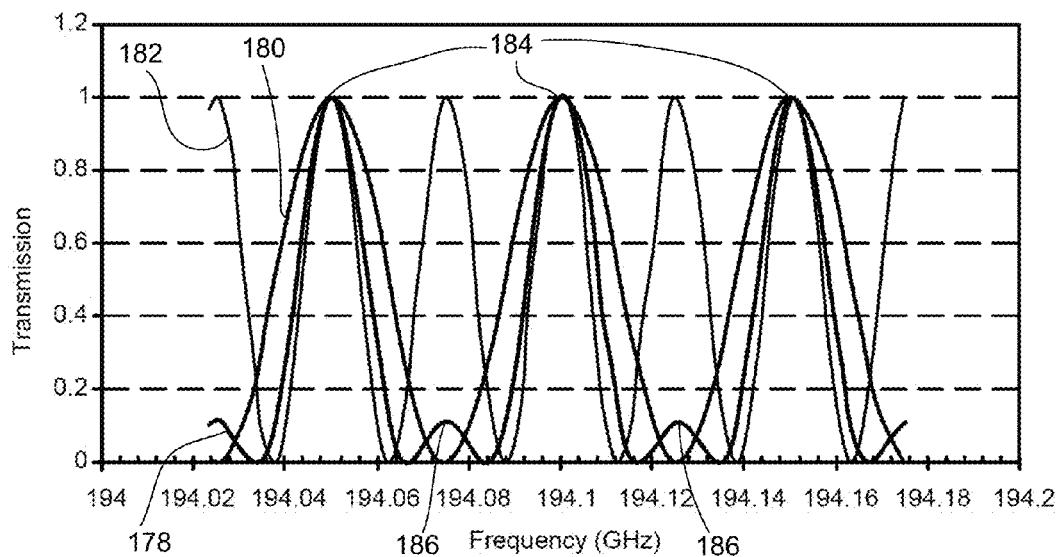
FIG. 14B is a plot of example transmission functions associated with the DLI of FIG. 14A.

Referring to FIG. 14B, the DLI 160 may have a transmission function 178 formed by the combination of a transmission function 180 of combined paths 162a and 162b and a transmission function 182 of combined paths 162a and 162c. As is apparent from FIG. 14B, transmission function 182 has an FSR that is about twice that of the transmission function 180. The combined transmission function 178 includes high peaks 184 and low peaks 186. As is apparent from FIG. 14B, the local minima between high peaks 184 and low peaks 186 are shifted relative to local minima 190 of the transmission function 182, giving the combined transmission function 178 a wider bandwidth than for a DLI including only paths 162a and 162C but not path 162b.

Figure 15A:
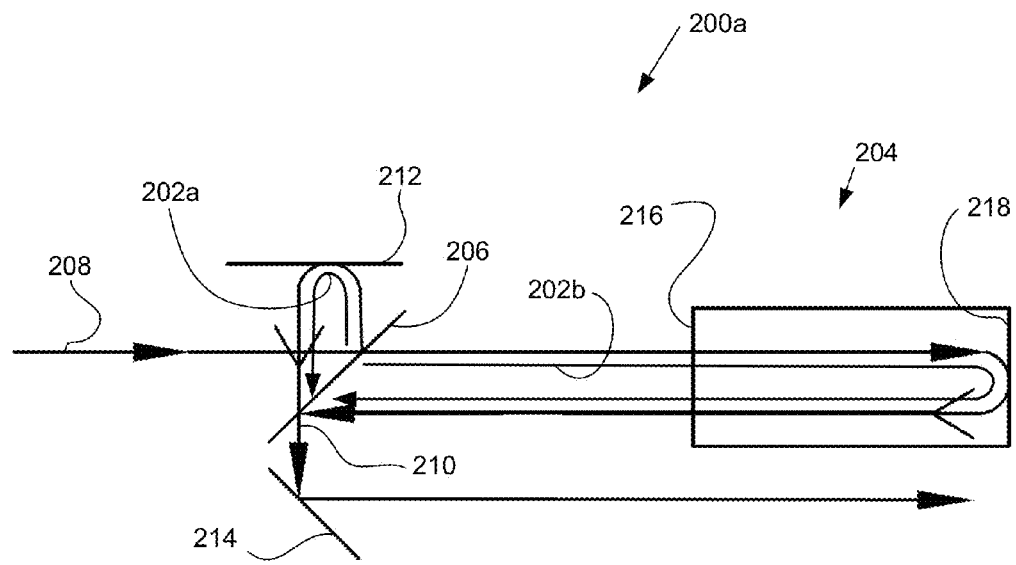
FIG. 15A is another example of a DLI and filter that can be implemented in the OSR of FIG. 1.

Referring to FIG. 15A, in an alternative embodiment the OSR 14 may be embodied as a DLI 200a including two optical paths 202a, 202b having different lengths and an etalon 204 operated in reflection and located within one of the optical paths 202a, 202b. In the illustrated embodiment, the DLI 200*a* includes a beam splitter 206 that operates both to split an input beam 208 along the two optical paths 202*a*, 202*b* and to combine light from the optical paths 202*a*, 202*b* into a single output beam 210. In other embodiments, a separate optical component may function as a combiner.

The splitter 206 is oriented to direct a portion of the input beam 208 toward a first mirror 212. The first mirror 212 is oriented to reflect light back through the splitter 206 onto a second mirror 214. The etalon 204 is positioned to reflect light from the input beam 208 that is transmitted through the splitter 206 back to the splitter 206. The splitter 206 reflects light reflected from the etalon 204 toward the second mirror 214. Light reflected from the second mirror 214 from either reflection from or transmission through the splitter 206 becomes the output beam 210.

The etalon 204 includes a first face 216 and a second face 218. The face 216 may have a reflectivity of less than 50% whereas the second face 218 has a reflectivity of greater than 90%. The reflectivities of the faces 216, 218 may be adjusted to vary the properties of the OSR 14 including the combined DLI 200*a* and etalon 204 of FIG. 15A.

Figure 15B:
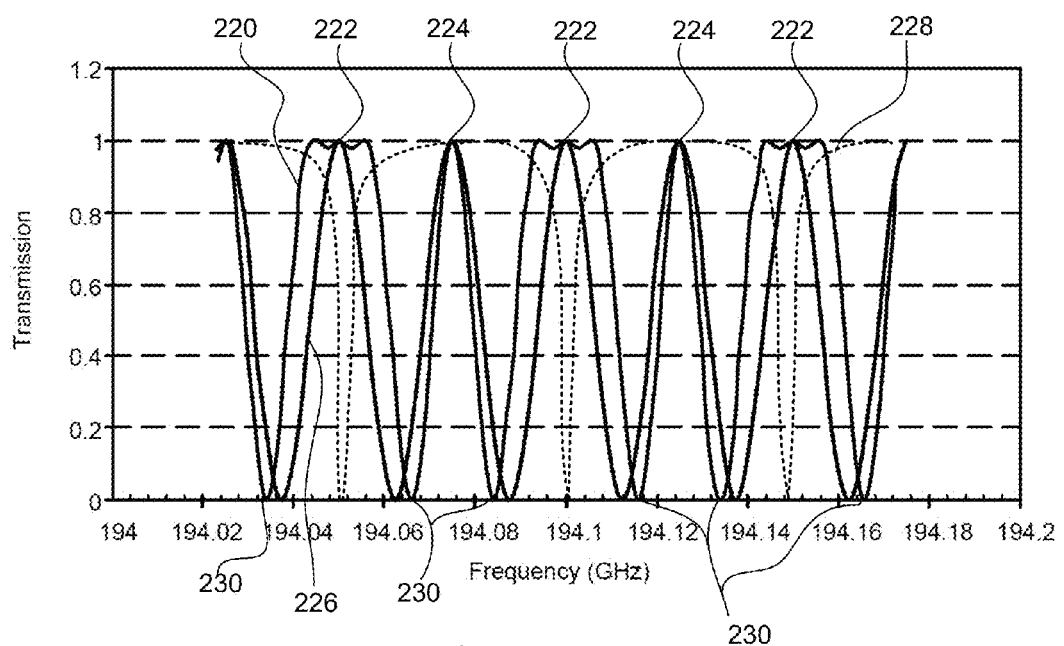
FIG. 15B is a plot of example transmission functions associated with the DLI and filter of FIG. 15A.

Referring to FIG. 15B, for a first face 216 having a reflectivity of 40% and a second face 218 having a reflectivity of 99%, the combined DLI 200*a* and etalon 204 of FIG. 15A have a combined transmission function 220 including high bandwidth peaks 222 and low bandwidth peaks 224. The transmission function 220 is a result of the combination of a transmission function 226 of the DLI 200*a* without the etalon 204 and a transmission function 228 of the etalon 204 alone. The etalon 204 may have an FSR that is about twice the FSR of the DLI 200*a* based on the difference in path length between the paths 202*a*, 202*b*.

The wider bandwidth of the high bandwidth peaks 222 facilitates transmission of high-bandwidth signals, e.g., those having a high bit rate. In some embodiments, the high bandwidth peaks 222 have a 3 dB bandwidth equal to between 0.5 and two times the bit rate of a signal transmitted through the OSR 14. In other embodiments, the high bandwidth peaks 222 have a 3 dB bandwidth of between 0.7 and 1.5 times the bit rate of a signal transmitted through the OSR 14. For example, for a drive signal having a bit rate of 10 GHz the high bandwidth peaks 222 may have a 3 dB bandwidth of from 7 to 15 GHz.

The high bandwidth peaks 222 may have a 3 dB bandwidth that is greater than one third the FSR of the DLI 200*a* in the absence of the etalon 204. In some embodiments, the FSR of the DLI 200*a* is greater than one sixth of the FSR of the etalon 204. The high bandwidth peaks 222 may have a 3 dB bandwidth that is greater than one half the FSR of the DLI 200*a* in the absence of the etalon 204 or greater than one fourth of the FSR of the etalon 204. In still other embodiments, the 3 dB bandwidth is greater than 60% of the FSR of the DLI 200*a* in the absence of the etalon 204 or greater than 30% of the FSR of the etalon 204. The bandwidth of the high bandwidth peaks 222 may be adjusted by adjusting the reflectivities of one or both of the faces 216, 218 of the etalon 204.

As is apparent in FIG. 15B, the transmission function 220 provides a high extinction ratio at minima 230 located between high bandwidth peaks 222 and low bandwidth peaks 224. The low bandwidth peaks 224 also have a high peak transmission and therefore provide good eye margin and good rise and fall times in the BB configuration or when used with dispersion compensation due to reduced sideband attenuation as discussed hereinabove.

Figure 15C:
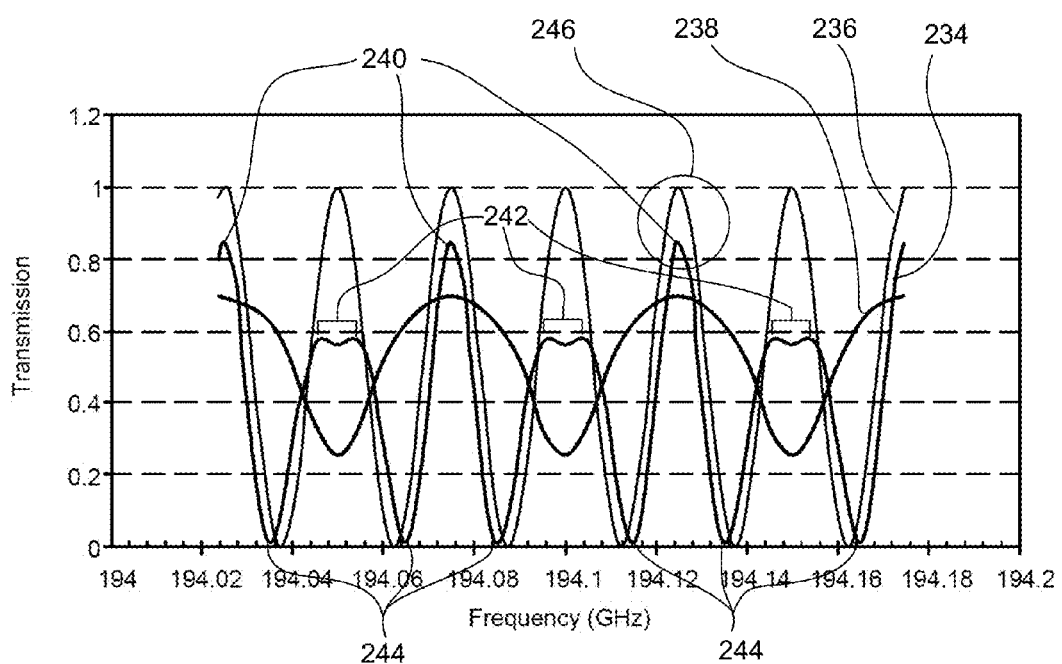
FIG. 15C is another plot of example transmission functions associated with the DLI and filter of FIG. 15A obtained by varying one or more reflectivity parameters of the filter of FIG. 15A.

Referring to FIGS. 15A and 15C, adjustment to the reflectivities of the faces 216, 218 of the etalon 204 may be used to adjust the sideband attenuation of an OSR 14 including the DLI 200*a* of FIG. 15A. For example, in some embodiments, the etalon 204 has a first face 216 having a reflectivity of less than 20% and a second face 218 having a reflectivity of less than 60%. For an etalon 204 having a first face 216 having a reflectivity of 10% and a second face 218 having a reflectivity of 50%, the combined DLI 200*a* and etalon 204 of FIG. 15A may have the combined transmission function 234 illustrated in FIG. 15C, the combined transmission function 234 resulting from the transmission function 236 of the DLI 200*a* in the absence of the etalon 204 and the transmission function 238 of the etalon 204.

The combined transmission function 234 includes high peaks 240 and low peaks 242 having local minima 244 located therebetween. The high peaks 240 may have a loss 246 such that transmission at the high peaks 240 is less than 100%. The low peaks 242 may be lower than the high peaks 240, resulting in sideband attenuation. For example, the low peaks 242 may be between 1 dB and 3 dB lower than the high peaks 240. In the illustrated embodiment, the low peaks 242 are about 2 dB lower than the high peaks 240. As noted above, attenuation of the sidebands improves dispersion tolerance of the signal. However, the sideband attenuation is not so high as to significantly degrade performance in the BB configuration or when used with dispersion compensation. The illustrated embodiment additionally provides good extinction at the local minima 244. For example, for an etalon 204 having a first face 216 having a reflectivity of 10% and a second face 218 having a reflectivity of 50%, the combined DLI 200*a* and etalon 204 provide an extinction of 19 dB at the local minima 244.

Figure 15D:
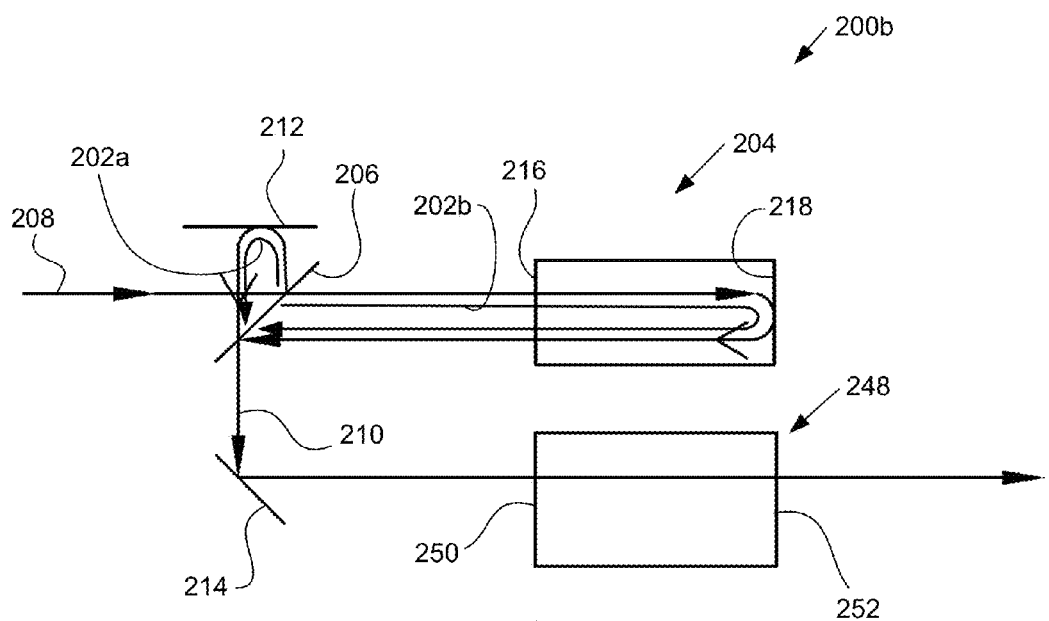
FIG. 15D is an example of a DLI and two filters that can be implemented in the OSR of FIG. 1.

Referring to FIG. 15D, in an alternative embodiment the OSR 14 may be embodied as a DLI 200*b* with the etalon 204 operated in reflection and located within one of the optical paths 202*a*, 202*b*, and a second etalon 248 operated in transmission and located in an optical path of the output beam 210.

The first face 216 of etalon 204 may have a reflectivity of less than 10% whereas the second face 218 of etalon 204 may have a reflectivity of greater than 40%. For instance, in some embodiments, the reflectivity of the first face 216 is substantially 0% and the reflectivity of the second face 218 is substantially 50%.

The second etalon 248 includes a first face 250 and a second face 252. In some embodiments, the first and second faces 250, 252 of second etalon 248 have reflectivities of between about 10% and 30%. In other embodiments, the first and second faces 250, 252 of second etalon 248 have reflectivities of between about 15% and 25%. In still other embodiments, the first and second faces 250, 252 of second etalon 248 have reflectivities of 20%.

Figure 15E:
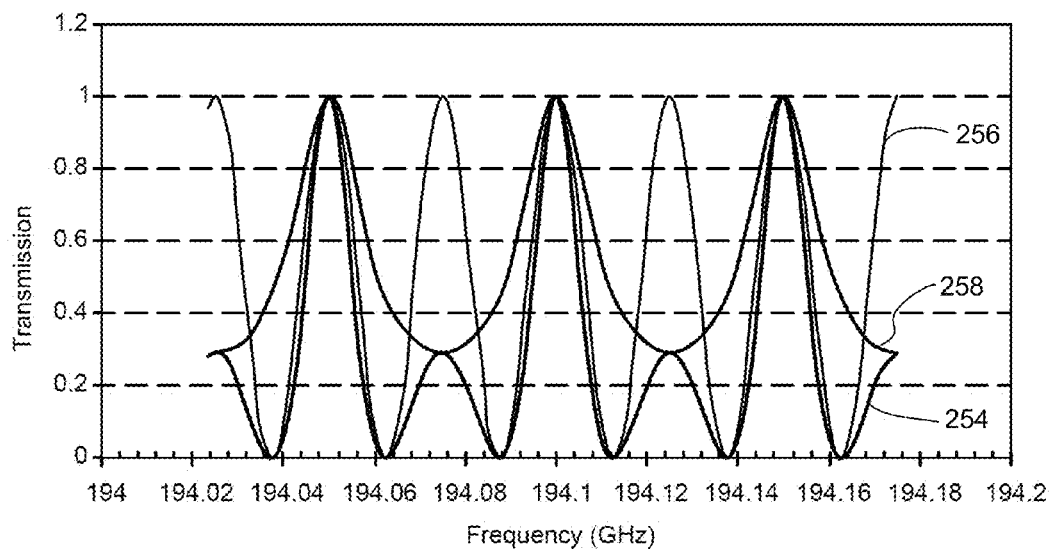
FIG. 15E is a plot of example transmission functions associated with the DLI and filters of FIG. 15D.

Referring to FIG. 15E, various transmission functions associated with an OSR 14 including the DLI 200*b* of FIG. 15D are depicted. In the illustrated embodiment of FIG. 15E, the first face 216 and second face 218 of etalon 204 have respective reflectivities of 0% and 50% and the first and second faces 250, 252 of second etalon 248 have reflectivities of 20%. The combined DLI 200*b* and etalons 204, 248 have a combined transmission function 254 resulting from the transmission function 256 of the DLI 200*b* with etalon 204 in the absence of the second etalon 248 and the transmission function 258 of the second etalon 248.

Figure 16A:
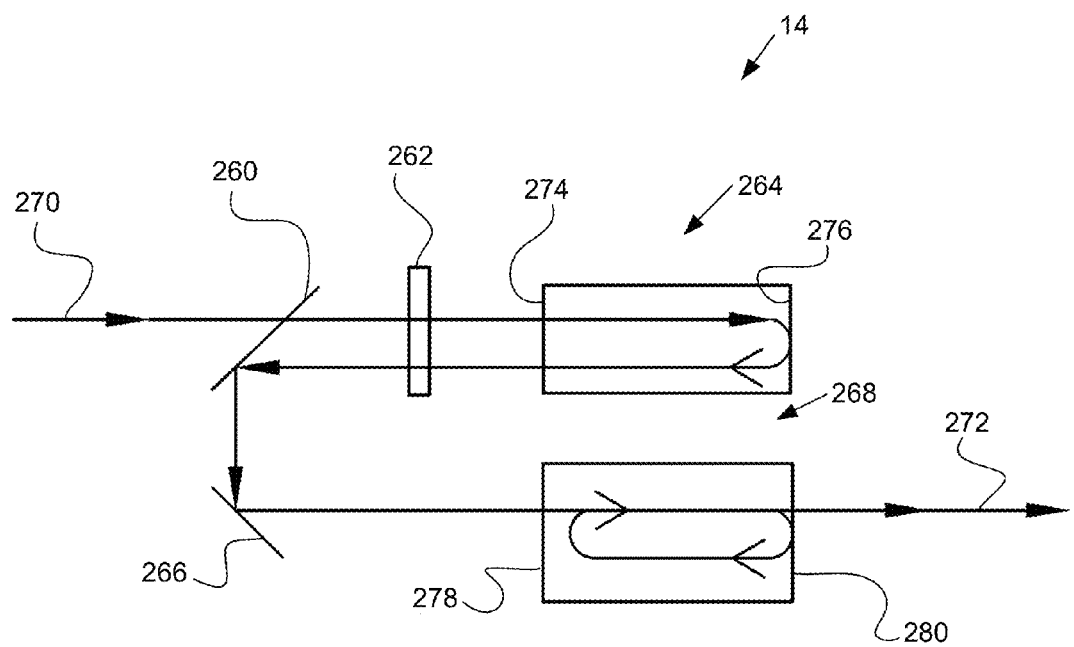
FIG. 16A is an example of two filters that can be implemented in the OSR of FIG. 1.

Referring to FIG. 16A, in an alternative embodiment an OSR 14 includes a first mirror 260, a faraday rotator 262, first etalon 264 operated in reflection, a second mirror 266, and a second etalon 268 operated in transmission. The first mirror 260 is configured and oriented to transmit substantially all of an input beam 270 through to the faraday rotator 262 and then the first etalon 264. The first etalon 264 is positioned to reflect the input beam 270 back through the faraday rotator 262 to the first mirror 260. The first mirror 260 reflects the light reflected from the first etalon 264 toward the second mirror 266, which redirects the reflected light to the second etalon 268. Light transmitted through the second etalon 268 becomes output beam 272

The first etalon 264 includes a first face 274 and a second face 276. The first and second faces 274, 276 of the first etalon 264 may have a reflectivity of greater than 70%. In some embodiments, each of the first and second faces 274, 276 of the first etalon 264 has a reflectivity substantially equal to 80%.

The second etalon 268 includes a first face 278 and a second face 280. The first and second faces 278, 280 of the second etalon 268 have reflectivities of between about 20% and 40%. In other embodiments, the first and second faces 278, 280 of the second etalon 268 have reflectivities of between about 25% and 35%. In still other embodiments, each of the first and second faces 278, 280 of the second etalon 268 has a reflectivity substantially equal to 30%.

Figure 16B:
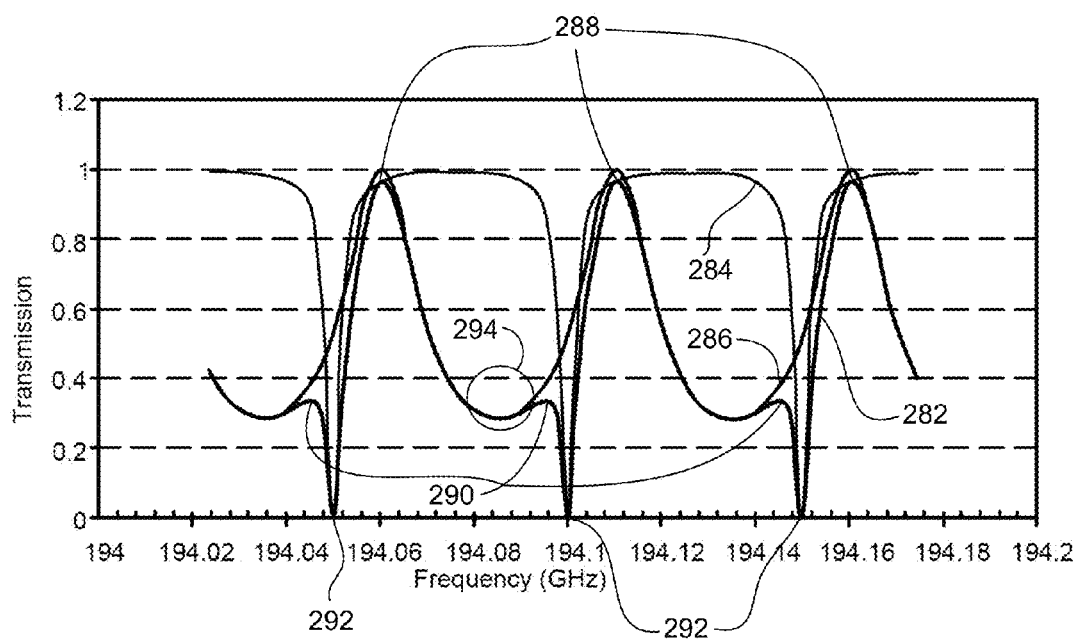
FIG. 16B is a plot of example transmission functions associated with the filters of FIG. 16A.

Referring to FIG. 16B, various transmission functions associated with the OSR 14 of FIG. 16A are depicted. In the illustrated embodiment of FIG. 16B, the first and second faces 274, 276 of the first etalon 264 have reflectivities substantially equal to 80% and the first and second faces 278, 280 of second etalon 248 have reflectivities substantially equal to 30%. The OSR 14 of FIG. 16A has a combined transmission function 282 resulting from a transmission function 284 of the first etalon 264 and a transmission function 286 of the second etalon 268. The combined transmission function 282 includes high peaks 288 and low peaks 290.

As is apparent in FIG. 16B, the combined transmission function 282 provides a high extinction ratio at minima 292 located between high peaks 288 and low peaks 290. In some embodiments, the extinction ratio at minima 292 is about 30 dB. The high peaks 288 also only experience a slight loss due to the rounded corners of the transmission function 284 of the first etalon 264. It can also be seen in the area 294 of FIG. 16B that the combined transmission function 282 provides good dispersion penalty.

Conventionally, optical filters/discriminators limit bandwidth and therefore increase rise/fall time of a transmitted signal. In particular, the bandwidth limiting effect of the optical filter/discriminator is the dominating effect on the transmitted signal which tends to increase the rise/fall time of the transmitted signal.

As is readily apparent from the present disclosure, however, some of the embodiments disclosed herein implement an optical filter/discriminator (e.g., an OSR 14) that effectively increases bandwidth and therefore decreases rise/fall time of a transmitted signal which opens its eye diagram and is desirable in some applications. This phenomenon can be explained as follows. First, the response of a laser as a function of frequency tends to roll off at high frequency such that the FM response has a slightly wider bandwidth than the AM response of the laser. According to some of the embodiments disclosed herein, the high frequency portions of an optical signal emitted by the laser are located on a positive slope portion of the transmission function of the optical filter/discriminator (e.g., the OSR 14), which provides FM-to-AM conversion of the optical signal such that the FM response adds to the AM response and provides an effectively wider bandwidth, thereby decreasing the rise/fall time of the optical signal after the optical filter. In these and other embodiments, the optical filters/discriminators therefore do not limit bandwidth and FM-to-AM conversion is the dominant effect causing rise/fall times after the optical filter/discriminator to be faster than before.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical communication system comprising:
    an optical transmitter configured to emit a frequency modulated signal having a bit rate frequency and a frequency excursion between 20% and 80% of the bit rate frequency; and
    an optical discriminator configured to convert the frequency modulated signal to a substantially amplitude modulated signal, wherein the optical discriminator includes:
    a delay line interferometer (DLI) including an input, an output, a first optical path coupling optical signals from the input to the output, and a second optical path coupling optical signals from the input to the output, the first and second optical paths having different lengths; and
    a filter positioned in the second optical path, wherein:
    a combined transmission function of the DLI and the filter is effective to cause at least one of a rise time or fall time of the substantially amplitude modulated signal to be less than a corresponding rise time or fall time of the frequency modulated signal;
    the combined transmission function has alternating high and low peaks; and the low peaks are between 1.5 and 4 dB lower than the high peaks.

2. The optical communication system of claim 1, wherein the filter comprises an etalon positioned in the second optical path and oriented to transmit a portion of light from the input to the output.

3. The optical communication system of claim 2, wherein the etalon includes first and second reflective surfaces each having a reflectivity of less than 40%.

4. The optical communication system of claim 2, wherein the etalon includes first and second reflective surfaces each having a reflectivity of less than or equal to about 30%.

5. An optical communication system comprising:
    an optical transmitter configured to emit a frequency modulated signal having a bit rate frequency and a frequency excursion between 20% and 80% of the bit rate frequency; and
    an optical discriminator configured to convert the frequency modulated signal to a substantially amplitude modulated signal, wherein the optical discriminator includes:
    a delay line interferometer (DLI) including an input, an output, a first optical path coupling optical signals from the input to the output, and a second optical path coupling optical signals from the input to the output, the first and second optical paths having different lengths; and
    a filter positioned in the second optical path to reflect a portion of light from the input to the output, wherein:
    a combined transmission function of the DLI and the filter is effective to cause at least one of a rise time or fall time of the substantially amplitude modulated signal to be less than a corresponding rise time or fall time of the frequency modulated signal; and the filter comprises an etalon having first and second reflective surfaces, the first reflective surface having a reflectivity of less than 20% and the second reflective surface having a reflectivity of less than 60%.

6. The optical communication system of claim 1, wherein the frequency excursion is between 25% and 75% of the bit rate frequency.

7. An optical communication system comprising:
an optical transmitter configured to emit a frequency modulated signal having a bit rate frequency and a frequency excursion between 20% and 80% of the bit rate frequency; and
an optical discriminator configured to convert the frequency modulated signal to a substantially amplitude modulated signal, wherein the optical discriminator includes:
a delay line interferometer (DLI) including an input, an output, a first optical path coupling optical signals from the input to the output, and a second optical path coupling optical signals from the input to the output, the first and second optical paths having different lengths; and
a filter positioned in the second optical path to reflect a portion of light from the input to the output, wherein:
a combined transmission function of the DLI and the filter is effective to cause at least one of a rise time or fall time of the substantially amplitude modulated signal to be less than a corresponding rise time or fall time of the frequency modulated signal; and
the filter comprises an etalon having first and second reflective surfaces, the first reflective surface having a reflectivity of less than 50% and the second reflective surface having a reflectivity of greater than 90%.

8. The optical communication system of claim 7, wherein the combined transmission function has alternating high bandwidth and low bandwidth peaks.

9. The optical communication system of claim 8, wherein the high bandwidth peaks have a 3 dB bandwidth greater than one half of a free spectral range of the DLI.

10. The optical communication system of claim 8, wherein the high bandwidth peaks have a 3 dB bandwidth greater than 60 percent of a free spectral range of the DLI.

11. The optical communication system of claim 7, wherein the first reflective surface has a reflectivity of less than or equal to about 40% and the second reflective surface has a reflectivity of at least 99%.

12. The optical communication system of claim 5, wherein the etalon comprises a first etalon, the optical discriminator further comprising a second etalon positioned to receive optical signals from the output of the DLI.

13. The optical communication system of claim 5, wherein the first reflective surface has a reflectivity less than or equal to about 10% and the second reflective surface has a reflectivity of at least 50%.

14. An optical communication system comprising:
an optical transmitter configured to emit a frequency modulated signal having a bit rate frequency and a frequency excursion between 20% and 80% of the bit rate frequency; and an optical discriminator configured to convert the frequency modulated signal to a substantially amplitude modulated signal, wherein the optical discriminator includes:
a delay line interferometer (DLI) including an input, an output, a first optical path coupling optical signals from the input to the output, and a second optical path coupling optical signals from the input to the output, the first and second optical paths having different lengths; and
an etalon positioned to receive optical signals from the output of the DLI, wherein:
a combined transmission function of the DLI and the etalon is effective to cause a rise time or fall time of the substantially amplitude modulated signal to be less than a corresponding rise time or fall time of the frequency modulated signal;
the combined transmission function has alternating high and low peaks; and
the high frequency portions of the frequency modulated signal transmitted through the optical discriminator are located on a positive slope portion of a high peak.

15. A method comprising:
modulating an optical signal source according to a data signal to produce a frequency modulated signal, the frequency modulated signal including high frequency portions encoding a first bit value and low frequency portions encoding a second bit value, the high and low frequency portions separated by a frequency excursion between 20% and 80% of a bit rate frequency of the frequency modulated signal; and
transmitting the frequency modulated signal through an optical discriminator to convert the frequency modulated signal to a substantially amplitude modulated signal, wherein the optical discriminator comprises:
a delay line interferometer (DLI) including an input, an output, a first optical path coupling optical signals from the input to the output, and a second optical path coupling optical signals from the input to the output, the first and second optical paths having different lengths, and
a filter positioned in the second optical path, wherein:
a combined transmission function of the DLI and the filter is effective to cause at least one of a rise time or fall time of the substantially amplitude modulated signal to be less than a corresponding rise time or fall time of the frequency modulated signal;
the combined transmission function has alternating high and low peaks; and the low peaks are between 1.5 and 4 dB lower than the high peaks.

16. The method of claim 15, wherein the frequency excursion is less than one half of a free spectral range of the DLI.

17. The method of claim 16, wherein the frequency excursion is less than one fourth of the free spectral range of the DLI.

18. The method of claim 15, wherein the high frequency portions are located on a positive slope portion of a high peak and wherein the low frequency portions are located at a local minimum between the high peak and an adjacent low peak.

19. The method of claim 15, wherein the filter comprises an etalon positioned in the second optical path and oriented to transmit a portion of light from the input to the output.

20. The method of claim 19, wherein the etalon includes first and second reflective surfaces each having a reflectivity of less than 40%.

21. The method of claim 19, wherein the etalon includes first and second reflective surfaces each having a reflectivity of less than or equal to about 30%.

22. A method comprising:
modulating an optical signal source according to a data signal to produce a frequency modulated signal, the frequency modulated signal including high frequency portions encoding a first bit value and low frequency portions encoding a second bit value, the high and low frequency portions separated by a frequency excursion between 20% and 80% of a bit rate frequency of the frequency modulated signal; and
transmitting the frequency modulated signal through an optical discriminator to convert the frequency modulated signal to a substantially amplitude modulated signal, wherein the optical discriminator comprises:
a delay line interferometer (DLI) including an input, an output, a first optical path coupling optical signals from the input to the output, and a second optical path coupling optical signals from the input to the output, the first and second optical paths having different lengths; and
a filter positioned in the second optical path, wherein:
a combined transmission function of the DLI and the filter is effective to cause at least one of a rise time or fall time of the substantially amplitude modulated signal to be less than a corresponding rise time or fall time of the frequency modulated signal; and
the filter comprises an etalon having first and second reflective surfaces, the first reflective surface having a reflectivity of less than 50% and the second reflective surface having a reflectivity of greater than 90%.

23. The method of claim 22, wherein the combined transmission function has alternating high bandwidth and low bandwidth peaks.

24. The method of claim 23, wherein the high bandwidth peaks have a 3 dB bandwidth equal to between about 0.5 and 2 times a bit rate of the data signal.

25. The method of claim 23, wherein the high bandwidth peaks have a 3 dB bandwidth equal to between about 0.7 and 1.5 times a bit rate of the data signal.

26. The method of claim 23, wherein the high frequency portions are located on a positive slope portion of a high bandwidth peak.

27. The method of claim 22, wherein the first reflective surface has a reflectivity of less than or equal to about 40% and the second reflective surface has a reflectivity of at least 99%.

28. A method comprising:
modulating an optical signal source according to a data signal to produce a frequency modulated signal, the frequency modulated signal including high frequency portions encoding a first bit value and low frequency portions encoding a second bit value, the high and low frequency portions separated by a frequency excursion between 20% and 80% of a bit rate frequency of the frequency modulated signal; and
transmitting the frequency modulated signal through an optical discriminator to convert the frequency modulated signal to a substantially amplitude modulated signal, wherein the optical discriminator comprises:
a delay line interferometer (DLI) including an input, an output, a first optical path coupling optical signals from the input to the output, and a second optical path coupling optical signals from the input to the output, the first and second optical paths having different lengths; and
a filter positioned in the second optical path, wherein:
a combined transmission function of the DLI and the filter is effective to cause at least one of a rise time or fall time of the substantially amplitude modulated signal to be less than a corresponding rise time or fall time of the frequency modulated signal; and
the filter comprises an etalon having first and second reflective surfaces, the first reflective surface having a reflectivity of less than 20% and the second reflective surface having a reflectivity of less than 60%.

29. The method of claim 28, wherein the first reflective surface has a reflectivity less than or equal to about 10% and the second reflective surface has a reflectivity of at least 50%.

* * * * *